(12) United States Patent
Gamache et al.

(10) Patent No.: US 11,467,140 B2
(45) Date of Patent: Oct. 11, 2022

(54) METHOD AND APPARATUS FOR ANALYSING A GAS CHROMATOGRAPHY ELUTION PEAK

(71) Applicant: MECANIQUE ANALYTIQUE INC., Thetford-Mines (CA)

(72) Inventors: Yves Gamache, Thetford-Mines (CA); Andre Lamontagne, Thetford-Mines (CA)

(73) Assignee: MECANIQUE ANALYTIQUE INC.

( * ) Notice: Subject to any disclaimer, the term of this patent is extended or adjusted under 35 U.S.C. 154(b) by 285 days.

(21) Appl. No.: 16/764,529

(22) PCT Filed: Nov. 14, 2018

(86) PCT No.: PCT/CA2018/051440
§ 371 (c)(1),
(2) Date: May 15, 2020

(87) PCT Pub. No.: WO2019/095053
PCT Pub. Date: May 23, 2019

(65) Prior Publication Data
US 2020/0371074 A1    Nov. 26, 2020

Related U.S. Application Data

(60) Provisional application No. 62/586,443, filed on Nov. 15, 2017.

(51) Int. Cl.
*G01N 30/86* (2006.01)
*G01N 30/74* (2006.01)
*G01N 30/02* (2006.01)

(52) U.S. Cl.
CPC ......... *G01N 30/8617* (2013.01); *G01N 30/74* (2013.01); *G01N 30/8631* (2013.01); *G01N 2030/025* (2013.01)

(58) Field of Classification Search
CPC ............... G01N 30/8617; G01N 30/74; G01N 30/8631; G01N 2030/025
See application file for complete search history.

(56) References Cited

U.S. PATENT DOCUMENTS 4,618,769 A * 10/1986 Johnson ................. G01N 30/74
                                                         250/339.08
5,273,632 A    12/1993 Stockham et al.
(Continued)

FOREIGN PATENT DOCUMENTS

| EP | 0868702 A1 | 6/1997 |
|---|---|---|
| WO | 9722942 A1 | 6/1997 |
| WO | 2016141463 A1 | 9/2016 |

OTHER PUBLICATIONS

International Search Report dated Jan. 23, 2019 in International Patent Application No. PCT/CA2018/051440.
(Continued)

*Primary Examiner* — Francis C Gray
(74) *Attorney, Agent, or Firm* — Kim IP Law Group LLC

(57) ABSTRACT

Methods and systems for measuring, in a gas stream, an analyte concentration level from a gas chromatography elution peak outputted by a gas chromatography system are provided. The method includes receiving an analyte signal representative of the gas chromatography elution peak in the time domain, converting the analyte signal from the time-domain to the frequency domain, in the frequency domain, preprocessing the analyte signal to distinguish frequencies of the analyte signal, integrating the analyte signal after preprocessing to obtain a redressed analyte signal in the time domain, the redressed analyte signal having a substantially Gaussian shape, and processing the redressed analyte signal to obtain the analyte concentration level. The system includes a detector operable for generating the analyte signal and one or more processors configured for preprocessing
(Continued)

and integrating the analyte signal to obtain the redressed analyte signal and processing the redressed analyte signal to obtain the analyte concentration level.

41 Claims, 17 Drawing Sheets

(56) References Cited

U.S. PATENT DOCUMENTS

| | | | |
|---|---|---|---|
| 6,377,341 B1* | 4/2002 | Rowlen | G01N 21/41 356/128 |
| 7,824,471 B2 | 11/2010 | Gamache et al. | |
| 2003/0108448 A1 | 6/2003 | Sacks et al. | |
| 2004/0126892 A1* | 7/2004 | Bogomolov | G01N 30/8624 702/22 |
| 2005/0230616 A1* | 10/2005 | Cameron | G01N 30/88 250/282 |
| 2007/0095125 A1 | 5/2007 | Bonne et al. | |
| 2011/0054804 A1 | 3/2011 | Pfaff | |
| 2016/0224830 A1 | 8/2016 | Noda et al. | |
| 2017/0030874 A1 | 2/2017 | Harrison et al. | |
| 2018/0149629 A1* | 5/2018 | Dasgupta | G01N 30/86 |

OTHER PUBLICATIONS

Written Opinion dated Jan. 23, 2019 in International Patent Application No. PCT/CA2018/051440.

European Search Report dated Sep. 6, 2021 in European Patent Application No. 18877338.

Michael F. Regehr et al., Ensemble averaging and digital filtering in chromatography and electrophoresis, Journal of Chromatography A, Jan. 28, 1994.

Alvin W. Moore Jr. et al., Median Filtering for Removal of Low-Frequency Background Drift, Anal. Chem. 1993.

* cited by examiner

METHOD AND APPARATUS FOR ANALYSING A GAS CHROMATOGRAPHY ELUTION PEAK

TECHNICAL FIELD

The technical field generally relates to chromatography applications and related chromatography methods and systems for processing an analyte signal. More particularly, the technical field relates to methods and systems for measuring, in a gas stream, an analyte concentration level from a gas chromatography elution peak outputted by a gas chromatography system.

BACKGROUND

In the field of gas chromatography (GC), an ideal impurity peak signal is preferably baseline resolved and has a shape akin to a normal Gaussian curve, such as shown in FIG. 1A (PRIOR ART). Such a peak is ideally well separated or distinct from any other ones in the GC run, with a signal to noise ratio typically higher than 3. Proper peak resolution between different analytes is optimized by proper chromatographic column selection, i.e., stationary phase selection and type (capillary, micropack or pack) as well as sample volume. Then the HETP (Height Equivalent to a Theoretical plate) operation point is optimized using techniques known in the art (see for example references [1] and [4]).

Various chromatographic data acquisition and related integration software are used to report peak area in term of percentage, ppm, ppb, ppt, and some other engineering units. Those software packages are optimized for Gaussian peaks or other standard peak shapes such as bi-Gaussian.

A standard peak facilitates the job of automatic peak finding algorithm. Normally, such algorithms rely on evaluating first and second derivatives calculated from predefined segment lengths to identify peak start and end. The obtained values are compared to ratio defined by the users, which requires experience. The peak beginning is identified when both first and second derivative are positive, and the peak end is identified when the first derivative is negative, and second derivative is positive, see for example FIGS. 2A-C (PRIOR ART). It is to be noted that such methods suffer greatly at low concentration when the signal to noise ratio is low due to noise amplification during derivative calculation.

An ideal Gaussian peak shape results from the fact that a GC system acts as a Gaussian transfer function or filter. Indeed, when a gaseous sample is injected, it has the form of a "slug" or a "pulse function". The travelling of this sample through the GC system spreads it so that the resulting analyte signal approximates a Gaussian signal shape.

The parameters governing the peak shape have been demonstrated by Van Demter in 1956. This equation (see FIG. 3—PRIOR ART) is useful to determine the theoretical equivalent plate number of a G.C. column, i.e., column separation efficiency (see for example reference [1]). However, this only applies to the separation column and excludes important external factors affecting the peak shape. Such parameters may for example include the tubing, fitting, chemical equilibrium of the system (i.e. adsorption and/or desorption rate of the system) and obviously detector physical shape and internal volume. An interesting mathematical treatment of the influence of various mechanical and fluidic system on the peak shape can be found, for example, in reference [2] and the different transfer functions are represented in FIG. 4 (PRIOR ART)

An impurity peak having a shape close to ideal peak shape, i.e., Gaussian, can be relatively easy to obtain under some circumstances such as at high impurity concentrations, if the detector response is strong, or conversely with low detector sensitivity but a large volume sample. In such cases the peak shape is less affected by dead volume, laminar flow effect and tubing dimension changes, etc. Furthermore, when the detector volume is much smaller than the sample volume, it is also easier to get a nice peak shape. These are factors related to the mechanical aspects of the system, sample dilution and dispersion into the internal detector volume and carrier gas.

Other factors affecting peak shape relate to chemical aspects of the GC system, such as the polarity of the molecules to be measured, column reactive sites created by impurities accumulation (see for example reference [5]), system active sites that can create peak tailing, chemical reactions into the detector, operating pressure, and many others.

All the parameters above can affect the peak shape and generate peaks that are not Gaussian or not Gaussian-like, often referred to as tailing peaks or ramp shape peak. These factors are not taken into consideration by the Van Deemeter equation.

Standard peak integration methods may be less effective when applied to non-Gaussian peaks, which often leads to undetected peak or incorrect beginning and ending time, even if the sample flowing in the detector contains analytes at a level sufficient to generate a meaningful detector signal. Traditional peak integration methods also lack robustness to cope with column aging which also alters peak shape. The traditional method consequently needs to be adjusted by a specialist over time.

While most integration software packages provide some powerful algorithm to process GC signal, distinguish the noise by various digital processing functions and distinguish quasi co-eluting peaks by convolution, there is some signal shape in the expected integration time window that are simply not recognized and reported as drifting base lines or missing peaks.

There is thus a need for methods and systems addressing at least some of the challenges presented above.

SUMMARY

In accordance with one aspect, there is provided a method for measuring, in a gas stream, an analyte concentration level from a gas chromatography elution peak outputted by a gas chromatography system. The method includes receiving an analyte signal representative of the gas chromatography elution peak in the time domain; converting the analyte signal from the time-domain to the frequency domain; in the frequency domain, preprocessing the analyte signal to distinguish frequencies of the analyte signal indicative of the analyte concentration level; integrating the analyte signal after preprocessing to obtain a redressed analyte signal in the time domain, the redressed analyte signal having a substantially Gaussian shape; and processing the redressed analyte signal to obtain the analyte concentration level.

In some embodiments, the method includes generating the analyte signal prior to said receiving, including circulating the gas stream in plasma chamber of a detector; generating a plasma in the gas stream; and measuring an optical emission of the plasma, the optical emission being representative of an analyte.

In some embodiments, the optical emission is a spectral line representative of the analyte present in the gas stream.

In some embodiments, measuring the optical emission of the plasma includes acquiring an emission signal; acquiring a reference signal; and subtracting the reference signal from the emission signal, thereby obtaining the analyte signal.

In some embodiments, the method includes digitizing the analyte signal before preprocessing the analyte signal.

In some embodiments, the analyte signal has a Nyquist frequency and wherein digitizing the analyte signal is performed at a sampling rate equal or higher than the Nyquist frequency.

In some embodiments, the method includes predetermining an expected elution time window, and wherein receiving the analyte signal representative of the gas chromatography elution peak is performed during the expected elution time window.

In some embodiments, the method includes, prior to the preprocessing, time-domain filtering the analyte signal to remove signal variations therefrom.

In some embodiments, time-domain filtering the analyte signal includes a continuous wavelet transform applied to the analyte signal.

In some embodiments, time-domain filtering the analyte signal includes a time-domain signal averaging of the analyte signal.

In some embodiments, converting the analyte signal from the time-domain signal to the frequency domain includes performing a Fourier transform on the analyte signal.

In some embodiments, preprocessing the analyte signal includes characterizing a DC component of the analyte signal; and filtering the DC component from the analyte signal.

In some embodiments, preprocessing the analyte signal includes selecting harmonic resonances of the analyte signal; and filtering the harmonic resonances from the analyte signal.

In some embodiments, preprocessing the analyte signal includes obtaining a noise signal representative of a noise level in the gas chromatography system by operating the gas chromatography system without an analyte to be measured therein; and subtracting the noise signal from the analyte signal.

In some embodiments, obtaining the noise signal includes obtaining noise harmonics associated with said noise signal, and wherein subtracting the noise signal includes filtering said noise harmonics from the analyte signal.

In some embodiments, preprocessing the analyte signal includes linearizing the analyte signal.

In some embodiments, circulating the gas stream in the plasma chamber of a detector includes varying at least one of a pressure and a flow of the gas stream in the plasma chamber, to alter a peak shape of the analyte signal.

In some embodiments, integrating the analyte signal includes summing harmonics of the redressed analyte signal.

In some embodiments, processing the redressed analyte signal includes performing a moving average on the redressed analyte signal to improve a signal-to-noise ratio of the redressed analyte signal.

In accordance with another aspect, there is provided a computer-implemented method executable by a processor for providing a redressed analyte signal representative of an analyte concentration level from a gas chromatography elution peak outputted by a gas chromatography system, the processor having received an analyte signal representative of the gas chromatography elution peak in the time domain, said method including; converting the analyte signal from the time-domain to the frequency domain; in the frequency domain, preprocessing the analyte signal to distinguish frequencies of the analyte signal indicative of the analyte concentration level; and integrating the analyte signal after preprocessing to obtain the redressed analyte signal in the time domain, the redressed analyte signal having a substantially Gaussian shape.

In some embodiments, the analyte signal includes an optical emission from a plasma generated in the gas stream.

In some embodiments, the optical emission is a spectral line representative of an analyte present in the gas stream.

In some embodiments, the computer-implemented method includes digitizing the analyte signal before preprocessing the analyte signal.

In some embodiments, the analyte signal has a Nyquist frequency and wherein digitizing the analyte signal is performed at a sampling rate equal or higher than the Nyquist frequency.

In some embodiments, the computer-implemented method includes, prior to the preprocessing, time-domain filtering the analyte signal to remove signal variations therefrom.

In some embodiments, time-domain filtering the analyte signal includes a continuous wavelet transform applied to the analyte signal.

In some embodiments, time-domain filtering the analyte signal includes a time-domain signal averaging of the analyte signal.

In some embodiments, converting the analyte signal from the time-domain signal to the frequency domain includes performing a Fourier transform on the analyte signal.

In some embodiments, preprocessing the analyte signal includes characterizing a DC component of the analyte signal; and filtering the DC component from the analyte signal.

In some embodiments, preprocessing the analyte signal includes selecting harmonic resonances of the analyte signal; and filtering the harmonic resonances from the analyte signal.

In some embodiments, preprocessing the analyte signal includes obtaining a noise signal representative of a noise level in the gas chromatography system by operating the gas chromatography system without an analyte to be measured therein; and subtracting the noise signal from the analyte signal.

In some embodiments, obtaining the noise signal includes obtaining noise harmonics associated with said noise signal, and wherein subtracting the noise signal includes filtering said noise harmonics from the analyte signal.

In some embodiments, preprocessing the analyte signal includes linearizing the analyte signal.

In some embodiments, integrating the analyte signal includes summing harmonics of the redressed analyte signal.

In some embodiments, the computer-implemented method includes performing a moving average on the redressed analyte signal to improve a signal-to-noise ratio of the redressed analyte signal.

In accordance with another aspect, there is provided a system for measuring, in a gas stream, an analyte concentration level from a gas chromatography elution peak, the system including a detector operable for generating an analyte signal representative of the gas chromatography elution peak; and one or more processors configured for receiving the analyte signal representative of the gas chromatography elution peak in the time domain; converting the analyte signal from the time-domain to the frequency domain; in the frequency domain, preprocessing the analyte signal to select frequencies of the analyte signal indicative of the analyte concentration level; integrating the analyte signal after preprocessing to obtain the redressed analyte signal in the time domain, the redressed analyte signal having a substantially Gaussian shape; and processing the redressed analyte signal to obtain the analyte concentration level.

In some embodiments, the one or more processors are further configured for digitizing the analyte signal before preprocessing the analyte signal.

In some embodiments, the analyte signal has a Nyquist frequency and wherein digitizing the analyte signal is performed at a sampling rate equal or higher than the Nyquist frequency.

In some embodiments, the one or more processors are further configured for predetermining an expected elution time window, and wherein receiving the analyte signal representative of the gas chromatography elution peak is performed during the expected elution time window.

In some embodiments, the one or more processors are further configured for, prior to the preprocessing, time-domain filtering the analyte signal to remove signal variations therefrom.

In some embodiments, time-domain filtering the analyte signal includes a continuous wavelet transform applied to the analyte signal.

In some embodiments, time-domain filtering the analyte signal includes a time-domain signal averaging of the analyte signal.

In some embodiments, converting the analyte signal from the time-domain signal to the frequency domain includes performing a Fourier transform on the analyte signal.

In some embodiments, preprocessing the analyte signal includes characterizing a DC component of the analyte signal; and filtering the DC component from the analyte signal.

In some embodiments, preprocessing the analyte signal includes selecting harmonic resonances of the analyte signal; and filtering the harmonic resonances from the analyte signal.

In some embodiments, preprocessing the analyte signal includes obtaining a noise signal representative of a noise level in the gas chromatography system by operating the gas chromatography system without an analyte to be measured therein; and subtracting the noise signal from the analyte signal.

In some embodiments, obtaining the noise signal includes obtaining noise harmonics associated with said noise signal, and wherein subtracting the noise signal includes filtering said noise harmonics from the analyte signal.

In some embodiments, preprocessing the analyte signal includes linearizing the analyte signal.

In some embodiments, integrating the analyte signal includes summing harmonics of the redressed analyte signal.

In some embodiments, processing the redressed analyte signal includes performing a moving average on the redressed analyte signal to improve a signal-to-noise ratio of the redressed analyte signal.

In some embodiments, the system includes an analog-to-digital converter configured to digitize the analyte signal.

In some embodiments, the detector is a plasma discharge detector.

In some embodiments, the detector is configured for generating a plasma in the gas stream; and measuring an optical emission of the plasma, the optical emission being representative of the analyte.

In some embodiments, the optical emission is a spectral line representative of the analyte present in the gas stream.

In some embodiments, measuring the optical emission of the plasma includes acquiring an emission signal; acquiring a reference signal; and subtracting the reference signal from the emission signal, thereby obtaining the analyte signal.

In accordance with another aspect, there is provided a non-transitory computer readable storage medium having stored thereon computer executable instructions for providing a redressed analyte signal representative of an analyte concentration level from a gas chromatography elution peak outputted by a gas chromatography system, the computer executable instructions, when executed by a processor having received an analyte signal representative of the gas chromatography elution peak in the time domain, cause the processor to perform the following steps converting the analyte signal from the time-domain to the frequency domain; in the frequency domain, preprocessing the analyte signal to select frequencies of the analyte signal indicative of the analyte concentration level; and integrating the analyte signal after preprocessing to obtain the redressed analyte signal in the time domain, the redressed analyte signal having a substantially Gaussian shape.

In some embodiments, the analyte signal includes an optical emission from a plasma generated in the gas stream.

In some embodiments, the optical emission is a spectral line representative of an analyte present in the gas stream.

In some embodiments, the non-transitory computer readable storage medium includes digitizing the analyte signal before preprocessing the analyte signal.

In some embodiments, wherein the analyte signal has a Nyquist frequency and wherein digitizing the analyte signal is performed at a sampling rate equal or higher than the Nyquist frequency.

In some embodiments, the non-transitory computer readable storage medium of includes, prior to the preprocessing, time-domain filtering the analyte signal to remove signal variations therefrom.

In some embodiments, time-domain filtering the analyte signal includes a continuous wavelet transform applied to the analyte signal.

In some embodiments, time-domain filtering the analyte signal includes a time-domain signal averaging of the analyte signal.

In some embodiments, converting the analyte signal from the time-domain signal to the frequency domain includes performing a Fourier transform on the analyte signal.

In some embodiments, preprocessing the analyte signal includes characterizing a DC component of the analyte signal; and filtering the DC component from the analyte signal.

In some embodiments, preprocessing the analyte signal includes selecting harmonic resonances of the analyte signal; and filtering the harmonic resonances from the analyte signal.

In some embodiments, preprocessing the analyte signal includes obtaining a noise signal representative of a noise level in the gas chromatography system by operating the gas chromatography system without an analyte to be measured therein; and subtracting the noise signal from the analyte signal.

In some embodiments, obtaining the noise signal includes obtaining noise harmonics associated with said noise signal, and wherein subtracting the noise signal includes filtering said noise harmonics from the analyte signal.

In some embodiments, preprocessing the analyte signal includes linearizing the analyte signal.

In some embodiments, integrating the analyte signal includes summing harmonics of the redressed analyte signal.

In some embodiments, the non-transitory computer readable storage medium includes performing a moving average on the redressed analyte signal to improve a signal-to-noise ratio of the redressed analyte signal.

In accordance with another aspect, there is provided a method for analysing a GC elution peak. The method includes steps of:
a. acquiring a digital analyte signal representative of the GC elution peak;
b. in the frequency domain, preprocessing the analyte signal after the acquiring step to remove unwanted features;
c. integrating the analyte signal after preprocessing to obtain a redressed analyte signal in the time domain, the redressed analyte signal having a substantially Gaussian shape; and
d. processing the redressed analyte signal.

In some embodiments, the step a) includes acquiring the analyte signal in differential mode to correct for baseline artifacts.

In some embodiments, the step a) includes digitizing the analyte signal.

In some embodiments, the unwanted features include a DC component.

In some embodiments, the unwanted features include harmonic resonances.

In accordance with another aspect, there is provided a method for preprocessing an analyte signal representative of a GC elution peak. The method includes steps of:
a. digitizing the analyte signal;
b. in the frequency domain, removing unwanted features from the analyte signal after the digitizing step; and
c. integrating the analyte signal to obtain a redressed analyte signal in the time domain, the redressed analyte signal having a substantially Gaussian shape.

In accordance with another aspect, there is provided an analysis system for analysing a GC elution peak. The analysis system includes a detector, a pre-processing module and a processing module. The detector is operable for acquiring an analyte signal representative of the GC elution peak. The pre-processing module includes an analog-to-digital converter and a processor. The analog-to-digital converter is configured to digitize the analyte signal. The processor is configured for transposing the analyte signal in the frequency domain, pre-processing the analyte signal to remove unwanted features therefrom, and integrating the analyte signal after preprocessing to obtain a redressed analyte signal in the time domain, the redressed analyte signal having a substantially Gaussian shape. The processing module processes the redressed analyte signal.

In some embodiments, the detector is operable in differential mode for correcting the analyte signal for baseline artifacts.

In accordance with another aspect, there is provided a pre-processing module for use in analysis system for analysing a GC elution peak. The analysis system includes a detector operable for acquiring an analyte signal representative of the GC elution peak. The pre-processing module includes an analog-to-digital converted and a processor. The analog-to-digital converter is configured to digitize the analyte signal. The processor is configured for transposing the analyte signal in the frequency domain, pre-process the analyte signal to remove unwanted features therefrom, and integrate the analyte signal after preprocessing to obtain a redressed analyte signal in the time domain, the redressed analyte signal having a substantially Gaussian shape.

The algorithm may be useful to process and remodel non-Gaussian peak area in order to extract useful information related to analyte concentration level and present the non-Gaussian peak in the standard Gaussian form that can be easily processed by any third-party GC. data acquisition hardware and related peak integration software.

While this algorithm (also interchangeably referred to as the "method" or the "methodology") works with almost any types of GC detector, it may be most appreciated with plasma discharge detector, such as the one described in the co-pending application WO/2016/141463A1, for example.

The methodology is divided into separate steps. First, the peak raw waveform may be digitized with a sampling rate high enough to support the digital processing. This data acquisition may be done, for example during the expected elution time window defined by time difference between T1 and T2, as illustrated in FIG. 1.

The data may be loaded into one dimensional matrices table, and the peak raw waveform may be traced on screen for visual observation.

Other features and aspects of the invention will be better understood upon reading of embodiments thereof with reference to the appended drawings

DETAILED DESCRIPTION

Figure 1A:
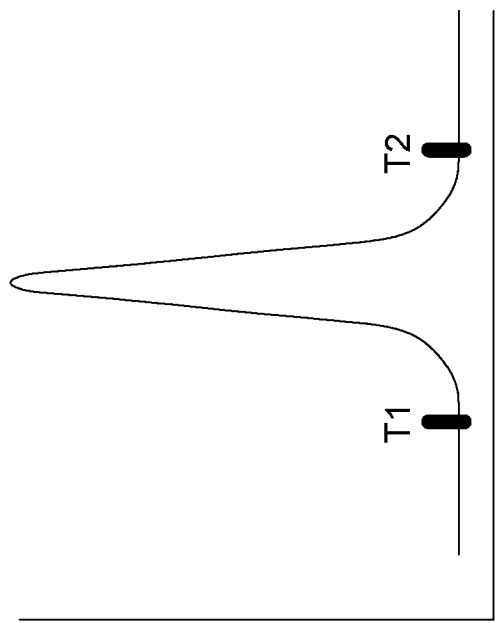
FIG. 1 illustrates a normal Gaussian peak (left) and a distorted tailing peak.

In the following description, similar features in the drawings have been given similar reference numerals, and, to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments.

Overview and Applications

The present description generally relates to the processing of gas chromatography signals and the analysis of related gas chromatography peaks, and for example provides a method for analysing an elution peak, a method for preprocessing an analyte signal representative of a gas chromatography elution peak, as well as systems for implementing such methods. More particularly, the description presents methods and systems for measuring, in a gas stream, an analyte concentration level from a gas chromatography elution peak outputted by a gas chromatography system.

Gas chromatography (GC) is a technical field where constituents of a gas sample are separated in order to be individually analysed and characterized. Typically, the gas stream outputted by a chromatography column includes one or more analytes (also referred to as "impurities" or "species") to be detected, carried by a carrier gas. The different species are outputted at different moments in time, each occurrence of a species along the gas stream being sometimes referred as an elution peak or an impurity peak. GC typically relies on a detector configured to generate an analyte signal representative of the concentration of the analytes or species carried by the carrier gas within each elution peak.

The species to be detected may be, for example and without being limitative, hydrogen ($H_2$), argon (Ar), oxygen ($O_2$), methane ($CH_4$), carbon monoxide (CO), carbon dioxide $CO_2$), water ($H_2O$), hydrocarbons, BTEX compounds, or others. Different types of carrier gases may also be selected depending on the application and the particularities of a given chromatography system. Typical carrier gases include argon (Ar), helium (He), nitrogen ($N_2$), hydrogen ($H_2$) and oxygen ($O_2$).

Embodiments disclosed herein may be suitable for use in conjunction with chromatography systems using all types of chromatographic columns, such as, for example and without being limitative, capillary, pack, micro pack, or any other columns generally used in the gas chromatography field and already known in the art. In some implementations, the methods and systems described herein may be particularly useful in contexts in which the molecular distribution of the analytes does not follow a Gaussian distribution. A Gaussian distribution of the analyte signals may be desirable for facilitating proper integration and processing of the analyte signal. Otherwise, the analyte signal may be misinterpreted by the chromatographic system and/or hardly characterizable. Different phenomenon can cause a non-Gaussian distribution of the analyte signal. For example, a non-Gaussian distribution could be associated with a low molar concentration of the analyte in the gas carrier. Such non-Gaussian analyte molecular distribution could also result from characteristics of the chromatography system itself. The gas chromatography system could also contain molecules clusters, which could be delayed by the fluidic components of the gas chromatography system. In such circumstances, the molecules clusters may become one of the relevant factors to be considered at low partial pressure of the analyte. More particularly, in such situation, the central limit theorem does not hold, i.e., the distribution of analyte is not Gaussian. The methods and systems described below may improve some aspects of the gas chromatography systems performances operated in the aforementioned exemplary scenarios, for example in terms of detection limit and measurements repeatability and/or linearity.

Methods

Figure 5:
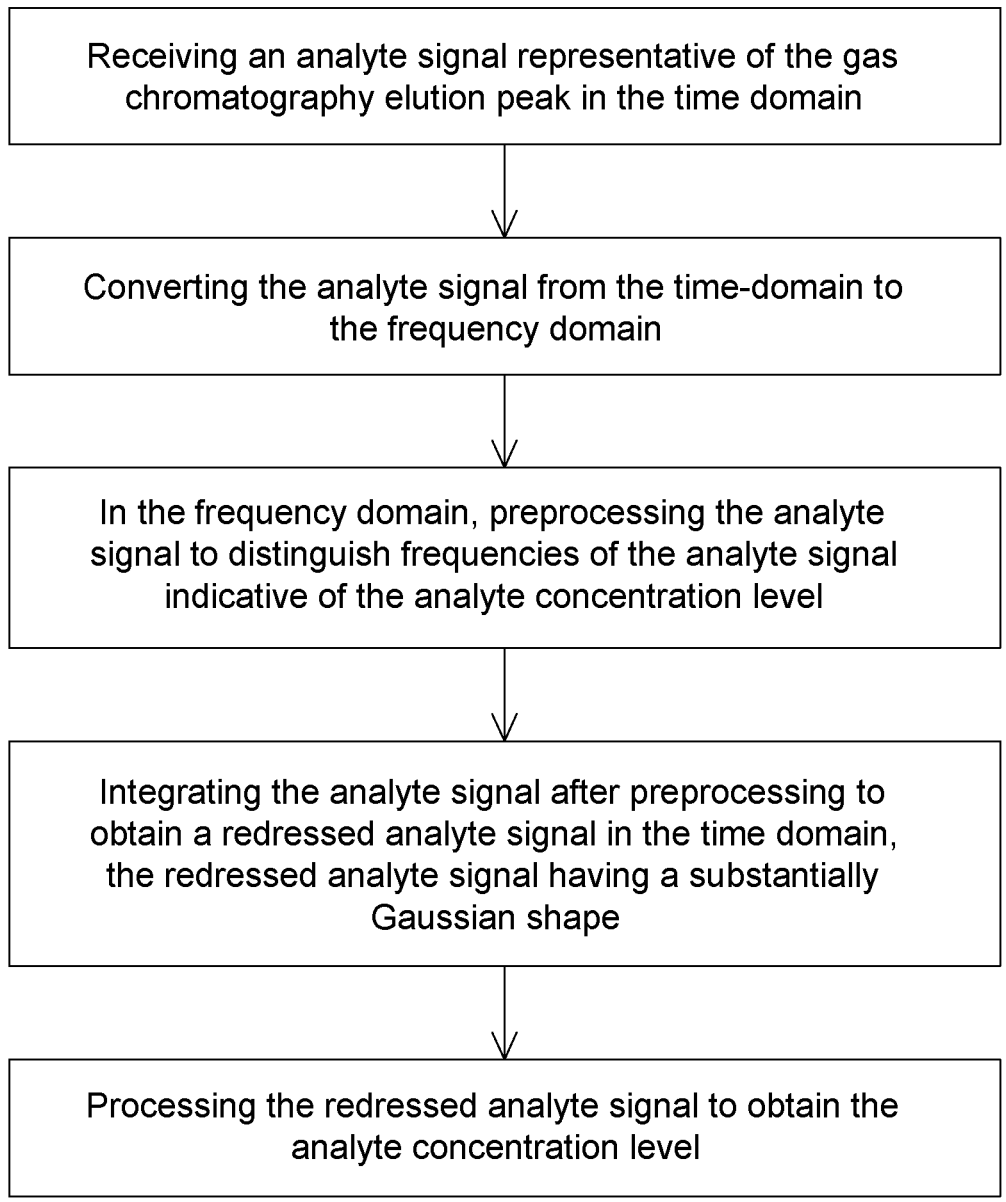
FIG. 5 is a workflow chart of a method for measuring, in a gas stream, an analyte concentration level from a gas chromatography elution peak, according to one embodiment.
Figure 6:
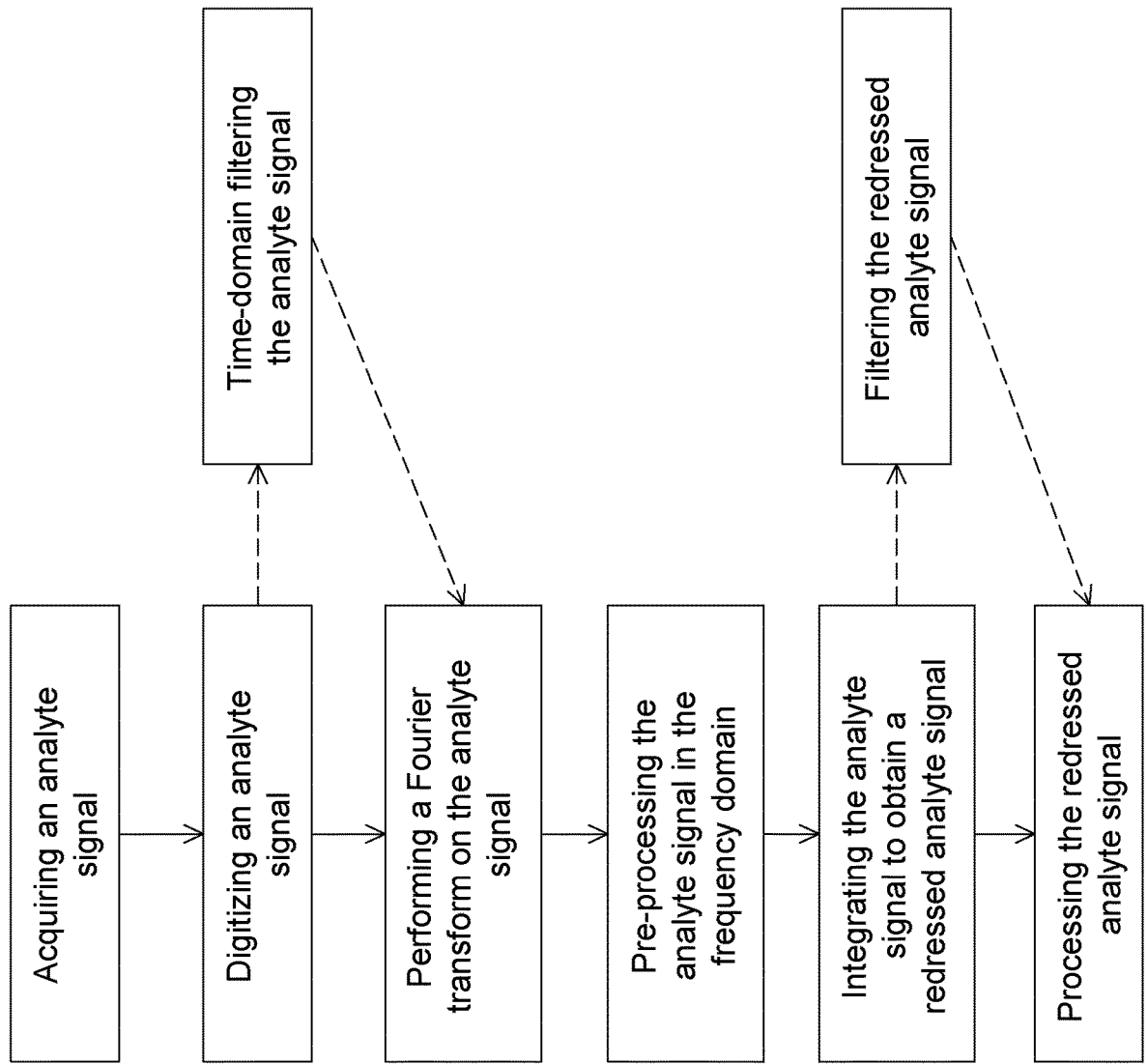
FIG. 6 is a workflow chart of a method for analyzing a gas chromatography elution peak, according to another embodiment.

With reference to FIG. 5, the description generally relates to a method for measuring, in a gas stream, an analyte concentration level from a gas chromatography elution peak outputted by a gas chromatography system. Broadly described, the method includes receiving an analyte signal representative of the gas chromatography elution peak in the time domain; converting the analyte signal from the time-domain to the frequency domain; in the frequency domain, preprocessing the analyte signal to distinguish frequencies of the analyte signal indicative of the analyte concentration level; integrating the analyte signal after preprocessing to obtain a redressed analyte signal in the time domain, the redressed analyte signal having a substantially Gaussian shape; and processing the redressed analyte signal to obtain the analyte concentration level. The description also presents a computer-implemented method executable by a processor. The computer-implemented method includes some of the steps mentioned above, for example: preprocessing the analyte signal and integrating the analyte signal after preprocessing. An alternate embodiment of this method is illustrated in FIG. 6.

In the context of the present disclosure the expression "distinguish" includes identifying and separating a signal representative of the analyte concentration from a signal considered as "noise". More particularly, preprocessing the analyte signal to distinguish frequencies of the analyte signal indicative of the analyte concentration level allows removing or filtering unwanted features from the analyte signal. As such, distinguishing frequencies of the analyte signal indicative of the analyte concentration level (sometimes referred to as "the signal of interest") allows to enhance or improve an intensity of the analyte signal with respect to background noise or undesirable portions of the signal. In the following description, the expression "distinguish", "discriminate" and "enhance" could be used interchangeably. It will be readily understood that the expressions "noise", "background noise", "unwanted features", "undesirable portions of the signal", or other similar expressions herein refer to signal or signal components that are not indicative and/or representative of the analyte concentration level. It is to be noted that the noise generally originates from other source(s) than the analyte itself, for example and without being limitative, the gas chromatography system or component(s) thereof.

Thus, the methods described herein may be useful to process non-Gaussian analyte signals, which may for example facilitate the extraction of useful information related to the analyte concentration level. The methods are compatible with different gas chromatography systems and could be implemented therein. In some embodiments, the methods may be used in combination with a plasma-based detector, as it has been previously presented with reference to the international patent application WO 2016/141463. Alternatively, the methods could also be suitable to be used with other traditional detectors (e.g., FID, ECD, TCD, FPD, DID, PID, or the like).

Now turning to FIGS. 8 to 15, the methods will now be described in greater detail.

Receiving the Analyte Signal

The method includes a first step of receiving an analyte signal representative of the gas chromatography elution peak in the time domain. This step could also be referred as an "acquisition step".

Figure 8:
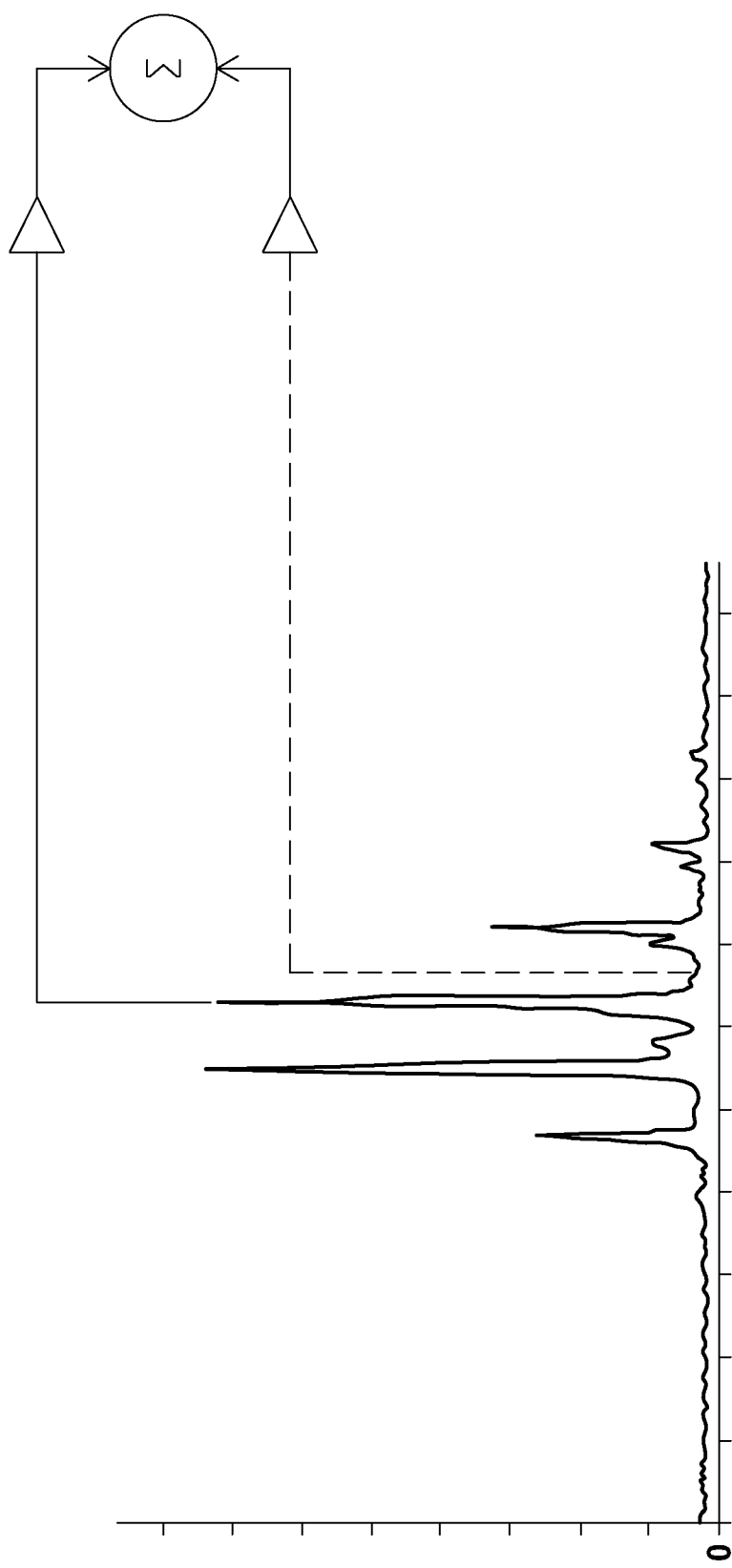
FIG. 8 illustrates a general working principle of an acquisition mode performed with a plasma-based detector, namely a differential measurement mode, according to one embodiment.
Figure 9:
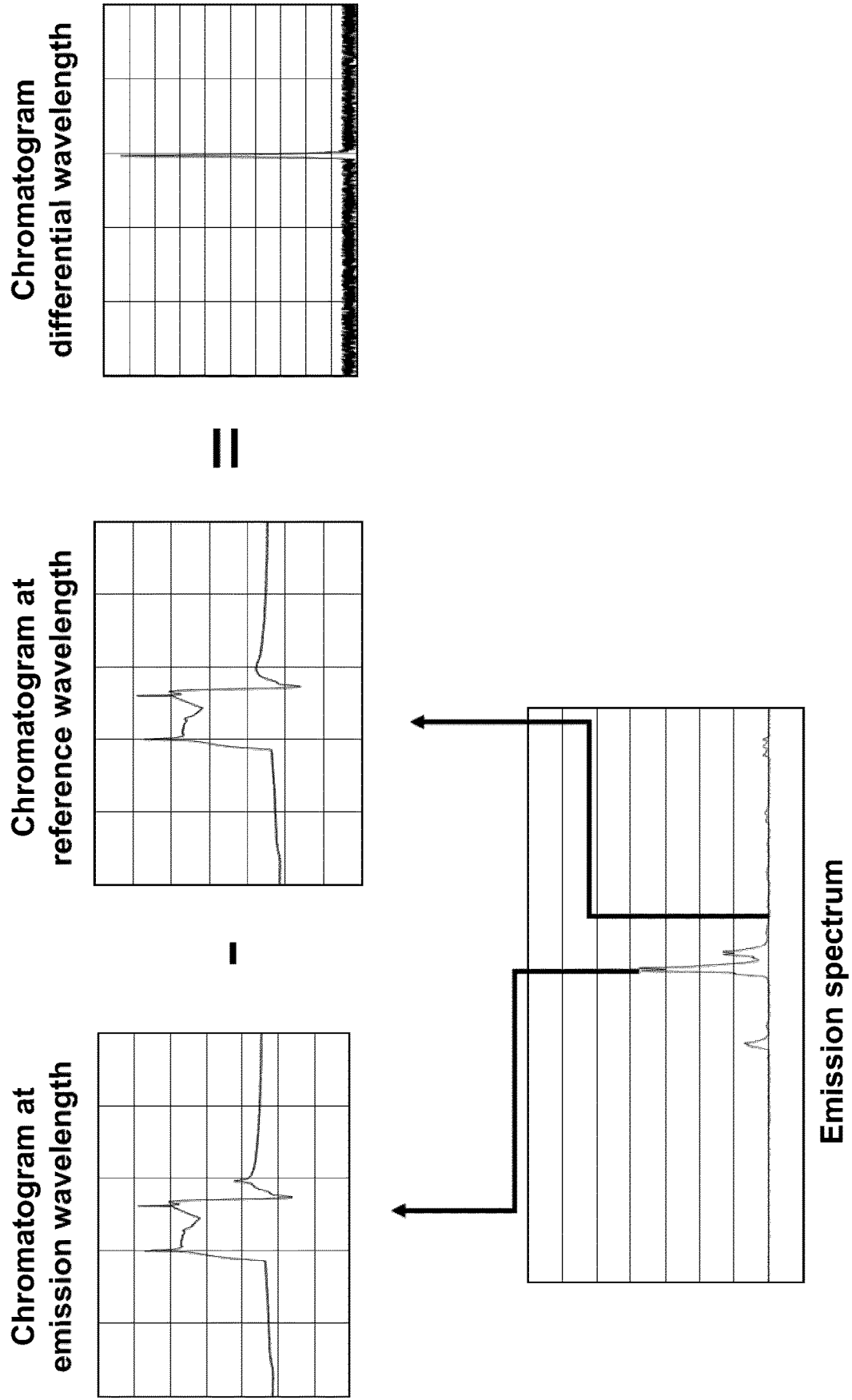
FIG. 9 shows substeps of the differential measurement mode of FIG. 8.
Figure 10:
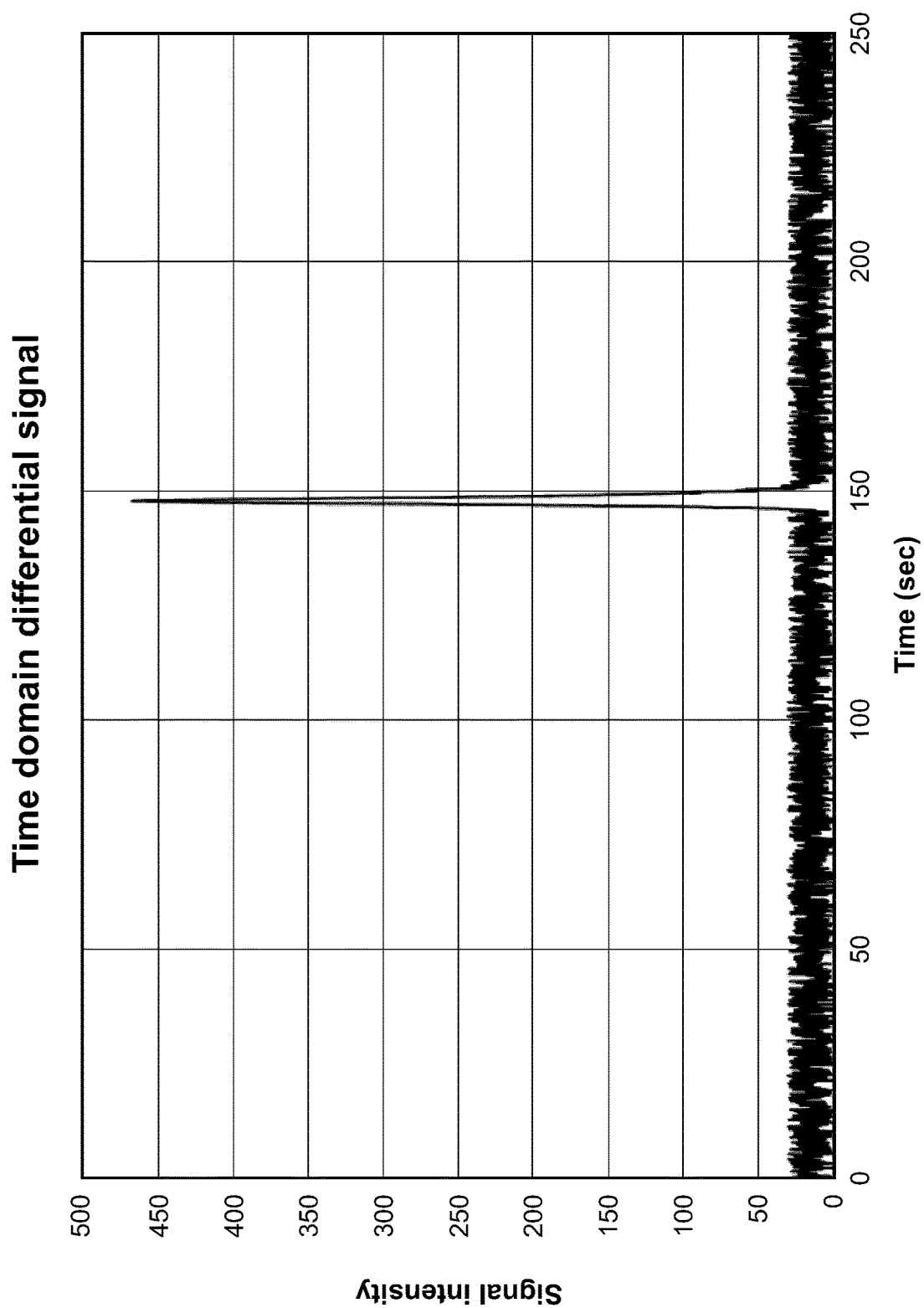
FIG. 10 illustrates an analyte signal representative of the gas chromatography elution peak in the time domain, according to one embodiment.
Figure 11:
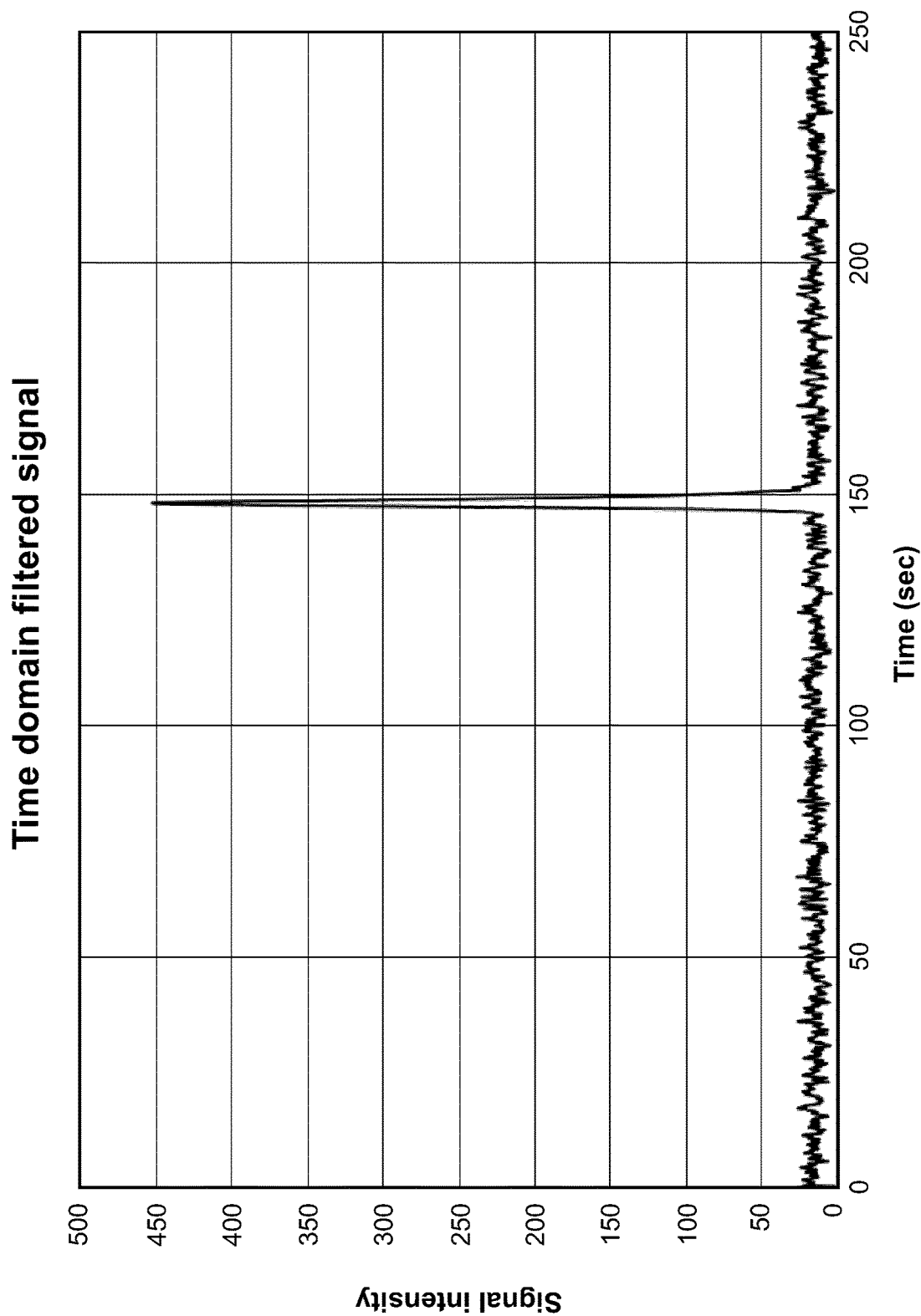
FIG. 11 illustrates the analyte signal in the time domain, after a filtering step, according to one embodiment.

In some embodiments, the step of receiving the analyte signal is performed in a "differential mode" (sometimes referred to as a "differential emission mode"). The expression "differential mode" will be used throughout the description and refers to an acquisition mode that can be performed with a plasma-based detector, as the one described in WO 2016/141463. This acquisition mode, which is illustrated in FIGS. 8 and 9, generally includes circulating the gas stream, which includes one or more analytes, in the gas chromatography system and generating the analyte signal upon detection of the analyte. The step of generating the analyte signal upon detection of the analyte includes generating a plasma in the gas stream and measuring an optical emission of the plasma, the optical emission being representative of the analyte. In some embodiments, the optical emission is a spectral line representative of the analyte present in the gas stream. More particularly, measuring the optical emission of the plasma could include acquiring an emission signal, acquiring a reference signal and subtracting the reference signal from the emission signal, thereby obtaining the analyte signal. An example of the analyte signal, in accordance with one embodiment, is illustrated in FIG. 10. In some embodiments, and the analyte signal is corrected for baseline artifacts.

More particularly, when the detector is operated in the differential mode, and now referring to FIG. 9, a reference wavelength (associated with the reference signal) and an emission wavelength (associated with the emission signal) are first determined, based on the optical emission properties of the plasma. In the illustrated example, the reference wavelength is determined at a wavelength at which the emission from the target species is substantially nil, while the emission wavelength is determined at a wavelength at which the emission is closed to a maximum, i.e., at a wavelength corresponding to a strong emission peak of the target species. Alternatively, the reference and/or emission wavelength(s) could be determined differently, according to one's need. Once the emission and reference wavelengths are determined, the emission elution signal (i.e., a chromatogram acquired at the emission wavelength) and the reference signal (i.e., a chromatogram acquired at the reference wavelength) are acquired. The reference signal is then subtracted from the emission elution signal, resulting in the analyte signal, which is representative of the GC elution peak. Preferably, both emission elution and reference signals are offset and scaled to have the same parasitic variation in intensity and phase resulting to baseline signal artifact prior to their subtraction. The resulting analyte signal is therefore representative of the GC elution peak as noise and drift caused by baseline upset due to pressure or/flow variation, bad sample background separation, or column temperature ramping are generally reduced or at least mitigated by the differential mode operation.

While the detector is preferably operated in the differential mode, the detector could also be operated in single ended mode or in other differential modes, and not limited to signals directly coming from the detector such as pressure, flow temperature or any others. Moreover, other modes such as power balance, electron injection, absorption and any other measurement modes could alternatively be used. In alternate embodiments, the acquisition step may be made by subtracting the baseline signal next to the emission signal (associated to a corresponding wavelength or band of interest) from the signal of the emission signal itself in real time. Both signals may be offset and scaled to have the same parasitic variation in intensity and phase due to baseline signal artifact. As such, the acquired signal may show very little noise and drift caused by baseline offset that may be associated with pressure and/or flow variation, bad sample background separation, or column temperature ramping.

In some embodiments, the analyte signal being received as an analog signal. As such, the method can include digitizing the analyte signal before preprocessing the analyte signal. It is to be noted that the analyte signal has a Nyquist frequency, and that the digitization of the analyte signal is typically performed at a sampling rate equal or higher than the Nyquist frequency. In some embodiments, the digitizing step comprises sampling the analyte signal with a sampling rate that is high enough to support the digital processing the analyte signal, i.e. allowing an appropriate digital representation of the analyte signal.

In some embodiments, the acquisition and digitization can be a combined step, or alternatively, the step of digitizing the analyte signal can follow the step of acquiring the analyte signal.

Figure 1B:
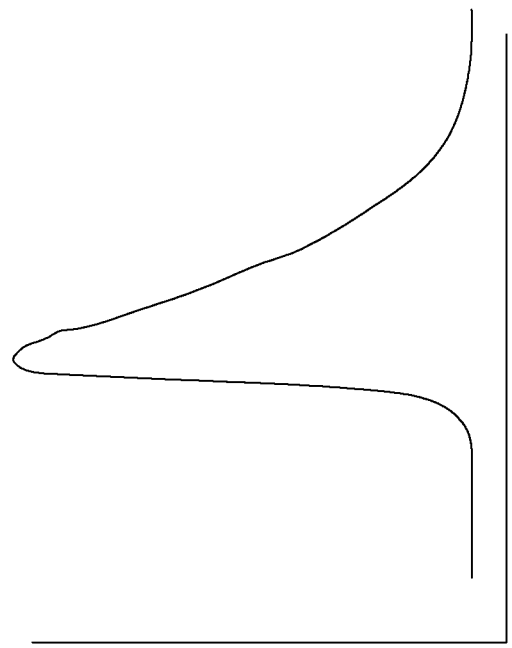
Figure 2A:
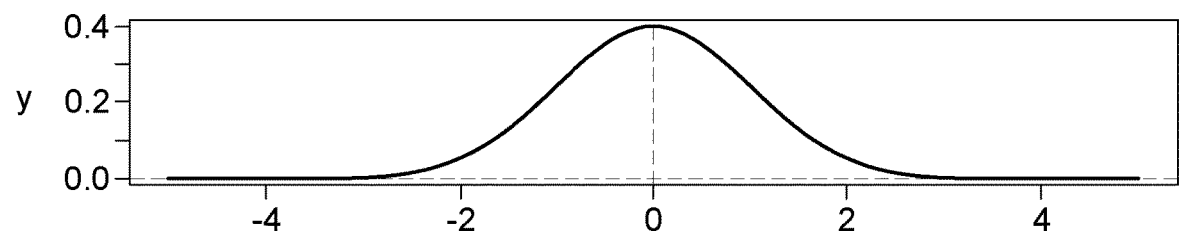
FIGS. 2A-C show a Gaussian peak, as wells as its first and second derivatives.
Figure 2B:
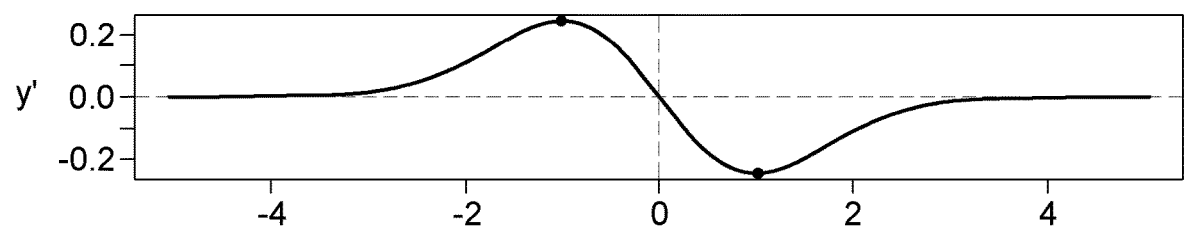
Figure 2C:
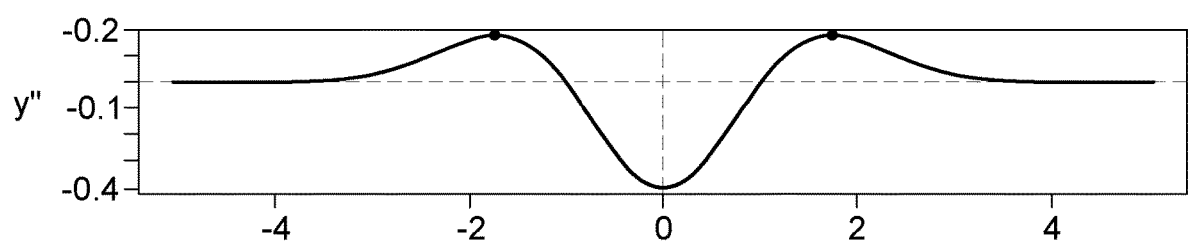
Figure 3:
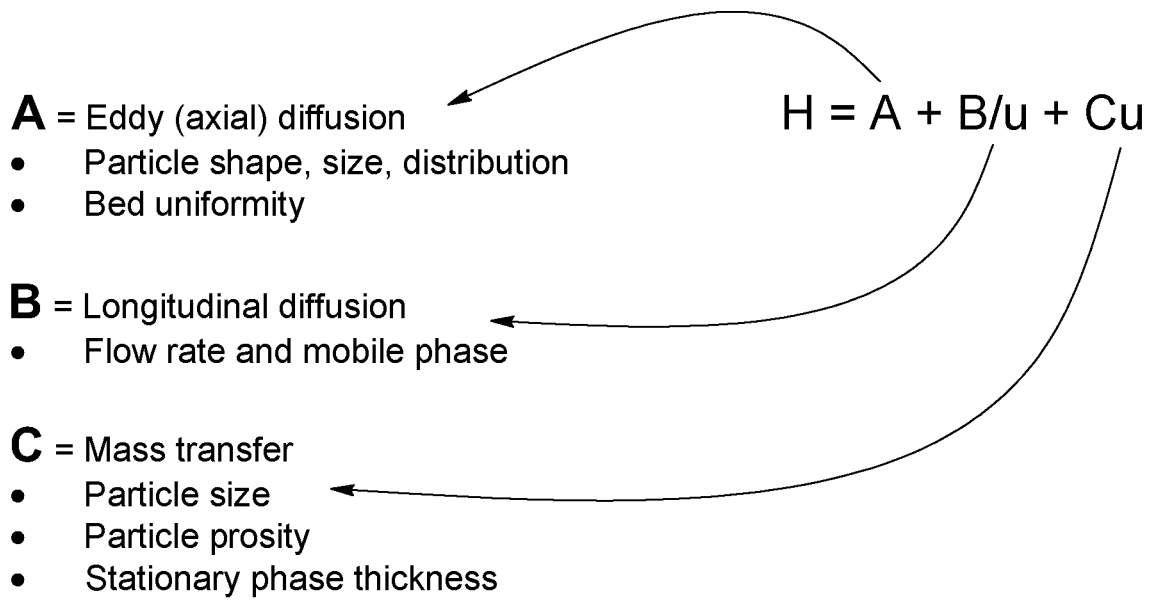
FIG. 3 represents the terms of the Van Deemter equation.
Figure 4:
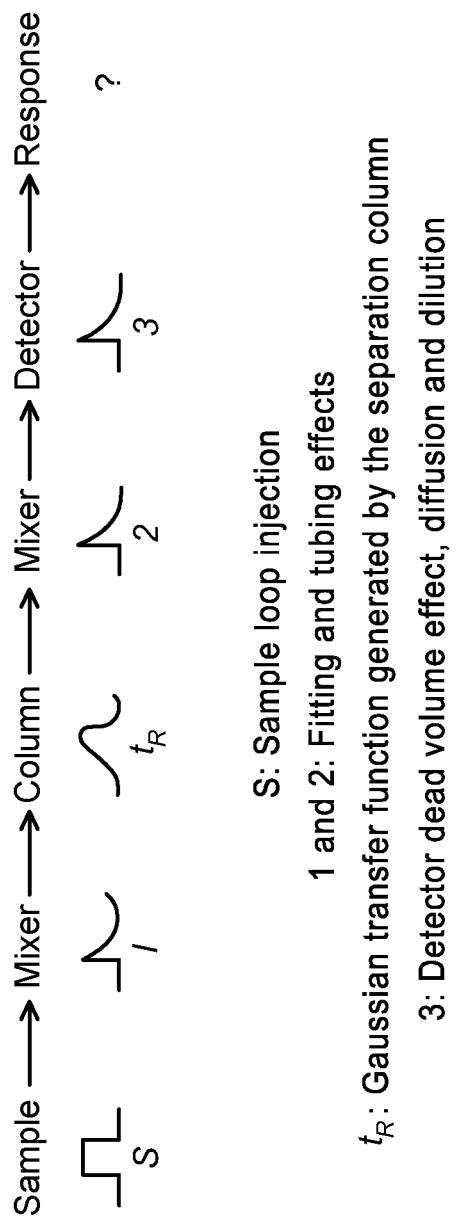
FIG. 4 shows an example of a gas chromatography system transfer function.

In some embodiments, the method includes predetermining an expected elution time window. In these embodiments, receiving the analyte signal representative of the gas chromatography elution peak is performed during the expected elution time window. As shown in FIG. 1, the expected elution time window is defined by a time difference between the instants T1 and T2. "T1" indicates the beginning of the elution window, while "T2" indicates the end of the elution window, which means that the analyte signal representative of the GC elution peak should be in practice acquired within the elution window, between instants T1 and T2. T1 and T2 are typically empirically defined, for example and without being limitative, by the use of a calibration gas containing the analyte to be characterised.

The acquisition step may further be accompanied by a step of preliminary displaying the analyte signal. In such scenario, for example, the acquired non-Gaussian analyte signal may be traced on a screen, hence allowing visual observation and inspection of the non-Gaussian analyte signal. More generally, the analyte may be displayed on any display device already known in the art.

In some embodiments, such as the one illustrated in FIG. 11*m* the analyte signal may be filtered in the time domain.

In some implementations, the data of the digitized analyte signal may be exported into a matrix (or any other array of numbers). For example, the data could be in digitally stored in a one-dimension matrix (e.g., included in a digital machine-readable medium). It will readily be understood that the data could be alternatively stored in different format by using different storing means and/or storage media, as it is already known in the art.

Converting the Analyte Signal from the Time-Domain to the Frequency Domain

Figure 12:
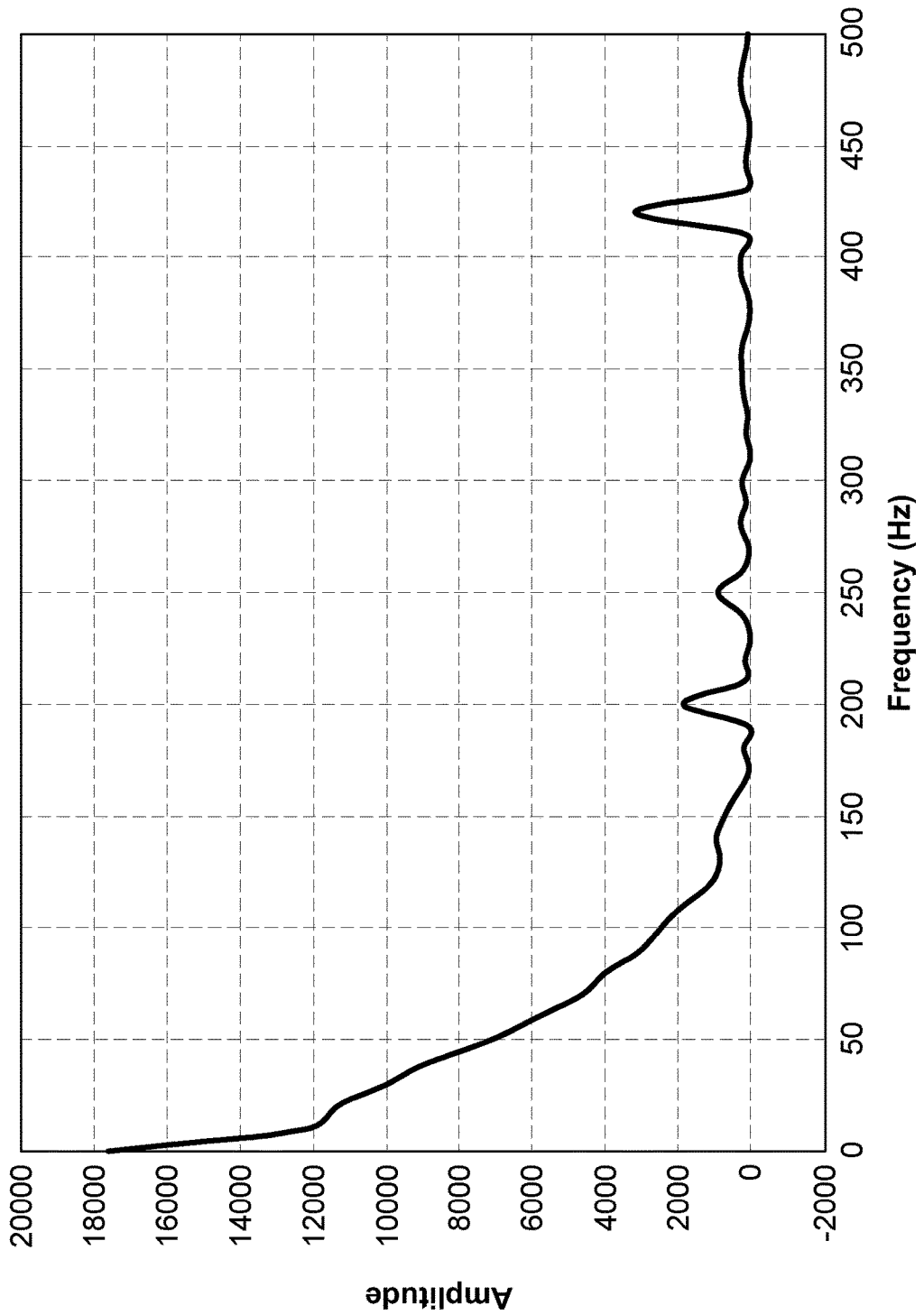
FIG. 12 shows the analyte signal after its conversion from the time-domain to the frequency domain, according to one embodiment.

The method includes converting the analyte signal from the time-domain to the frequency domain. An example of the analyte signal in the frequency domain is illustrated in FIG. 12.

In some embodiments, the method may comprise, prior to the preprocessing, time-domain filtering the analyte signal to remove signal variations therefrom, which may include, for example and without being limitative optional steps performed on the analyte signal as received.

An example of time-domain filtering the analyte signal includes a continuous wavelet transform applied to the analyte signal. The continuous wavelet transform generally allows reducing baseline fluctuation and improve the signal to noise of the analyte signal.

In some embodiments, time-domain filtering includes varying at least one of a pressure and a flow of the gas stream in the gas chromatography system, to alter a peak shape of the analyte signal. Such step is sometimes referred as a "flow variation or pressure variation method", and may be performed in order to reduce or, in some scenarios, cancel signal variations that are caused by system variations. For example, and without being limitative, this step can allow cancelling the baseline variation caused by a chromatographic column head pressure swing, hence flow variation, during the sample injection can be achieved through this step. Varying the pressure and/or the flow of the gas stream may be useful to improve the quality of the redressed analyte signal that will be obtained after the preprocessing step.

In some embodiments, time-domain filtering includes performing a time-domain ensemble averaging of the analyte signal for improving the signal-to-noise ratio of the analyte signal, for example by amplifying the "meaningful signal" (i.e., the signal of interest) and reducing the random noise amplitude.

The method further includes a step of performing a Fourier transform on the analyte signal, which in the context of the following non-limitative example, is assumed to be non-Gaussian. As will be understood by one skilled in the art, performing the Fourier transform on the analyte signal converts the analyte signal from a time-domain signal to a frequency-domain signal.

Preprocessing the Analyte Signal

The method includes a step of preprocessing, in the frequency domain, the analyte signal to distinguish frequencies of the analyte signal indicative of the analyte concentration level. The preprocessing step generally aims at removing unwanted features from the signal of interest. Broadly described, preprocessing the analyte signal may include substeps of extracting DC components from the analyte signal, noise filtering the analyte signal, processing fundamental harmonics through Gaussian filter(s) and/or other substeps and techniques.

Figure 13:
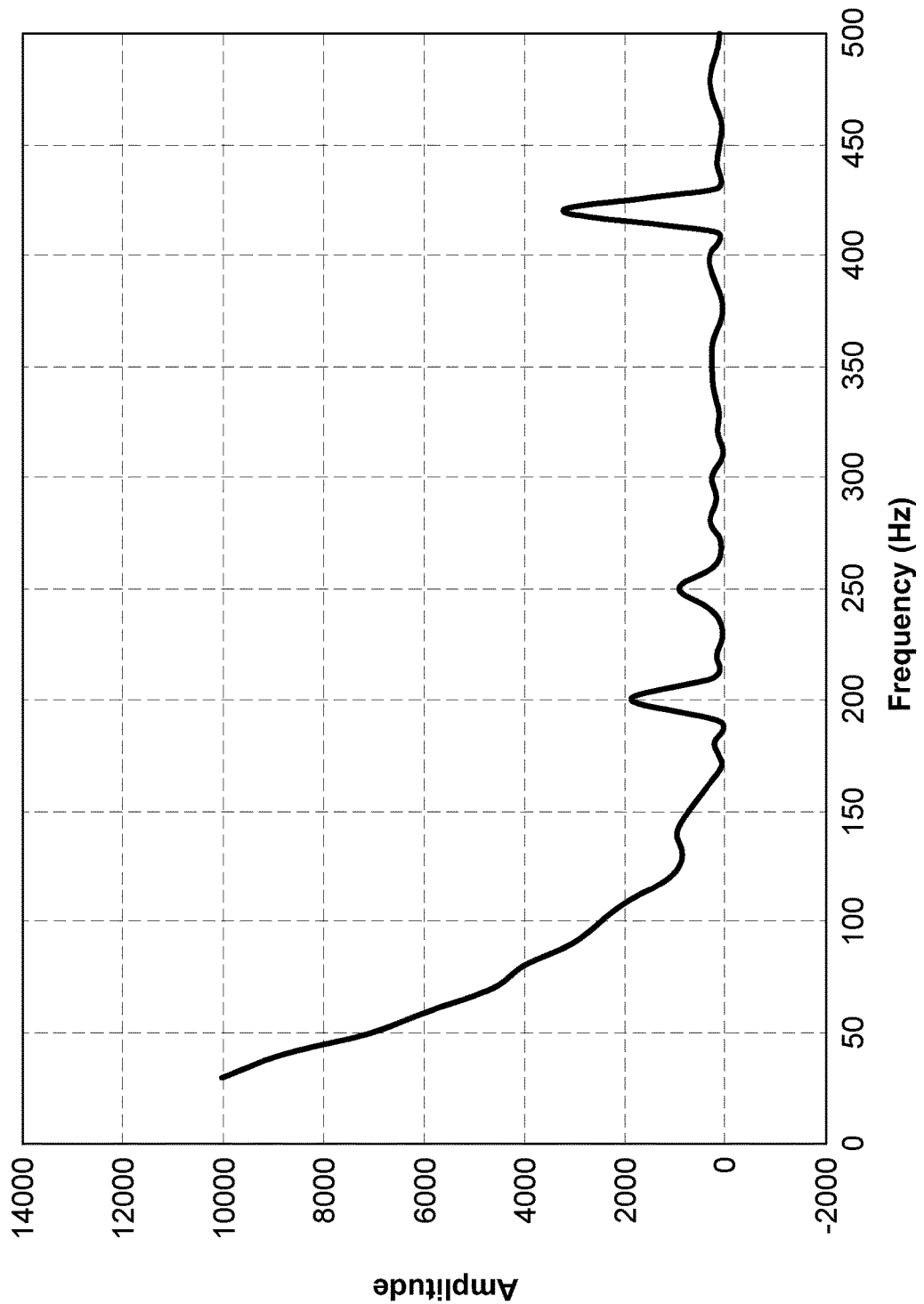
FIG. 13 illustrates the analyte signal in the frequency domain, after a filtering step, according to one embodiment.

In some embodiments, preprocessing the analyte signal includes characterizing a DC component of the analyte signal and filtering the DC component from the analyte signal. The step of removing the DC component of the non-Gaussian analyte signal may involve low frequencies in the frequency domain. It is to be noted that a similar substep (i.e., subtracting the DC component or drift) could be performed in the time domain before the conversion in the frequency domain. Filtering the DC component is typically useful to mitigate the effects of the baseline drifting of the analyte signal. This step of filtering the DC component is illustrated in FIG. 13.

Figure 14:
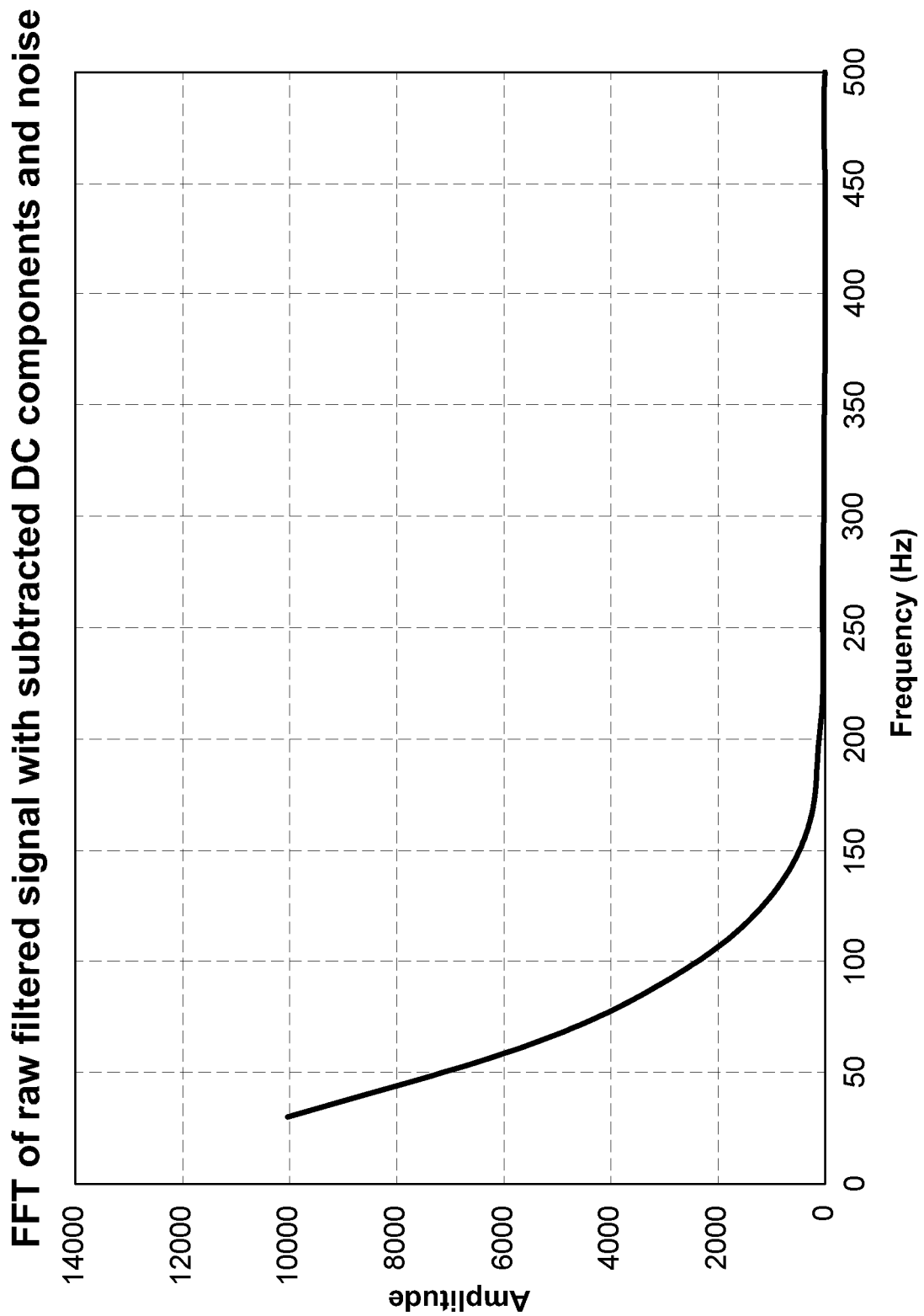
FIG. 14 illustrates a preprocessed analyte signal in the frequency domain, according with one embodiment.
Figure 15:
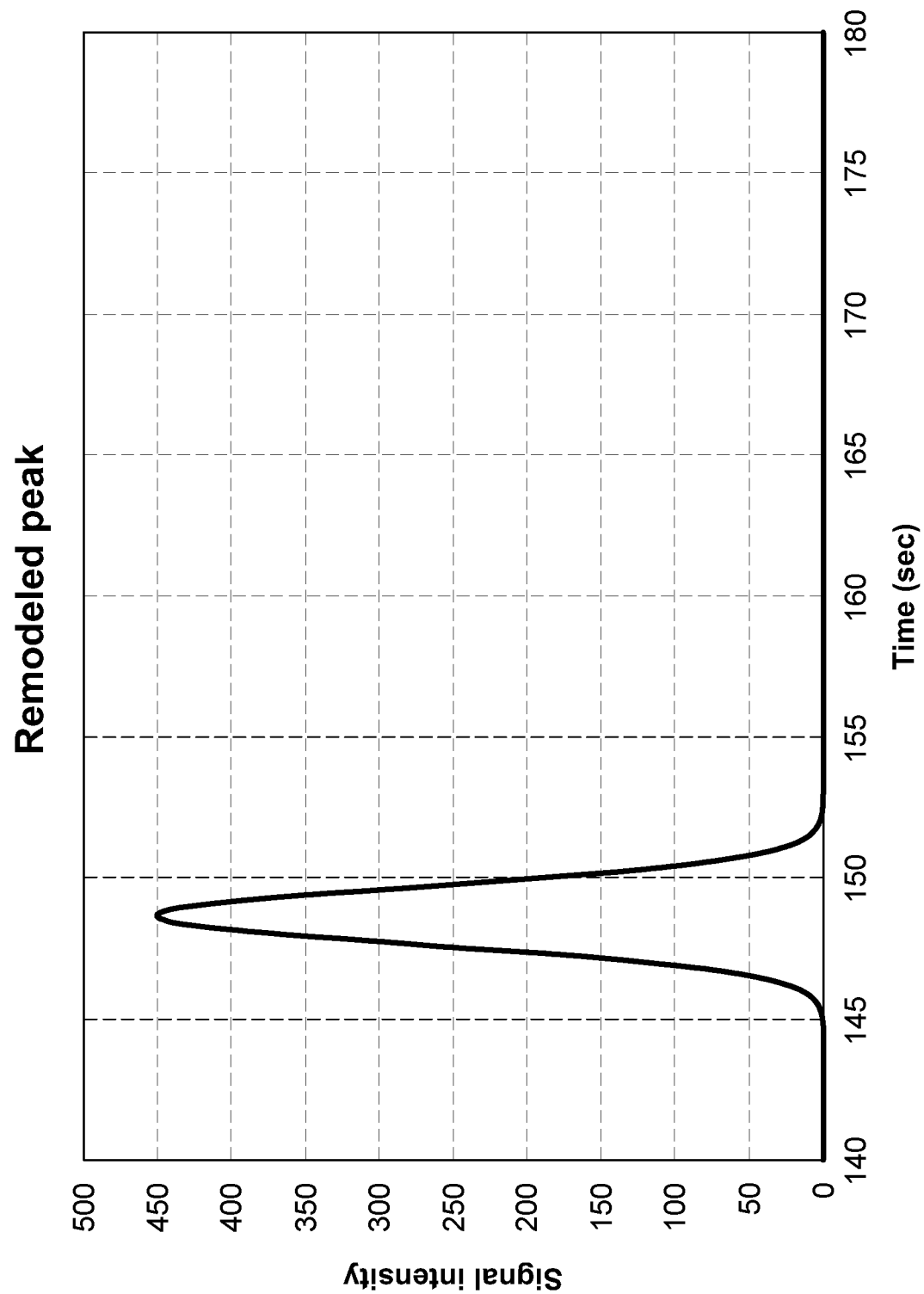
FIG. 15 shows a redressed analyte signal in the time domain, according with one embodiment.

In some embodiments, preprocessing the analyte signal includes obtaining a noise signal representative of a noise level in the gas chromatography system by operating the gas chromatography system without an analyte to be measured therein, and subtracting the noise signal from the analyte signal. In the frequency domain, the non-Gaussian analyte signal can be noise-filtered to reduce the noise of the signal. The noise components or sources could result, for example and without being limitative, from shot noise, electronics noise (e.g., by coupling) and/or optical noise associated with the plasma excitation signal (e.g., the fundamental frequency and/or the harmonics frequencies). An example of a signal resulting from this step is illustrated in FIG. 14

In one implementation, this step includes selecting harmonic resonances of the analyte signal and filtering the harmonic resonances from the analyte signal. The harmonic resonances could include fundamental harmonics, and the substep can include selecting and filtering the fundamental harmonics of the non-Gaussian analyte signal in the frequency domain. In some embodiments, such a filtering may be performed with a corresponding Gaussian filter. In some embodiments, the method may optionally comprise a step of linearizing the non-Gaussian analyte signal. This step can be required, for example and without being limitative, when the detector is operating in a non-linear region.

In order to properly distinguish frequencies of the analyte signal that are indicative of the analyte concentration level, it could be relevant to properly characterise the system signal noise and its variation when no analyte is circulating in the system. The results of this characterisation can then be provided or fed to the algorithm in order to be subsequently used to filter out the frequency components which are not indicative of the analyte concentration. In some implementation, this characterisation step can be done manually.

Integrating the Analyte Signal

The method includes integrating the analyte signal, after the preprocessing step, to obtain a redressed analyte signal in the time domain. The integrating step may be performed by one or more processors (or a processing module). The redressed analyte signal typically has a substantially Gaussian shape, such as the one illustrated in FIG. 15.

The preprocessing step and the integrating step thus allow remodeling or reshaping the analyte signal having a non-Gaussian shape into the redressed analyte signal having a substantially Gaussian shape. The expression "Gaussian shape" herein refers as the "bell curve shape" of a Gaussian function. It is readily understood that the step of integrating the analyte signal includes and is not limited to summing and/or integrating the non-Gaussian analyte signal (in the frequency domain) to obtain the redressed analyte signal (sometimes referred to as "a Gaussian remodeled peak"). The Gaussian remodeled peak is typically a digital signal.

In some embodiments, the step of integrating the analyte signal includes summing together the harmonics of the redressed analyte signal.

In some embodiments, an optional step of executing a moving average function or other filtering techniques may be performed on the redressed analyte signal. The number of points or peak used in this averaging step is dependent on the target sensitivity and desired response time.

In some embodiments, the redressed analyte signal may be traced on a screen in real-time. It is to be noted that executing a moving average function or other filter techniques on the redressed analyte signal is typically performed to enhance the signal-to-noise ratio of the analyte signal.

Processing the Redressed Analyte Signal

Once the redressed analyte signal is obtained, the redressed analyte signal can be sent towards one or more processors (sometimes referred to as a "processing module") Processors used to process the redressed analyte signal are standard and are configured to receive a Gaussian signal as an input.

More generally, it would be understood that gas chromatography systems of prior art generally tend to be compatible with methods of processing a Gaussian analyte signal, and as such may misinterpret a received analyte signal. However, in the context of the current method, the preprocessing step allows to transform an analyte signal having a non- Gaussian shape into a redressed analyte signal having a substantially Gaussian shape, which could be processed using known processing methods.

In some embodiments, the pre-processing, integrating and processing steps can be combined in one step, which is the case when these three steps are performed using a single processor (or, alternatively, several processors directly connected and/or combined in a single processing module). In such embodiments, the redressed analyte signal may then be directly sent towards the processing module without the need of conversion. The processor(s) may then perform standard processing steps, such as the ones already known in the art (e.g., integrating the redressed analyte signal and/or performing further processing steps). Alternatively, the Gaussian remodeled peak could be sent towards a digital-to-analog converter (DAC) for converting the digital version of the redressed analyte signal into an analog version of the redressed analyte signal in order to be processed by a third-party software.

Processing the redressed analyte signal may include, for example and without being limitative, digitally filtering and processing the redressed analyte signal, performing different operations (e.g., additions, subtractions, ratio calculations, Fourier transforms, filtering, averaging, or any other mathematical functions), analysing the collected information and/or controlling the operation of the different components of the system implementing the methods.

In some embodiments, processing the redressed analyte signal includes performing a moving average on the redressed analyte signal to improve a signal-to-noise ratio of the redressed analyte signal.

In some embodiments, the method comprises outputting and/or displaying the redressed analyte signal.

Systems

Now that the methods for measuring, in a gas stream, an analyte concentration level from a gas chromatography elution peak outputted by a gas chromatography system, have been described, systems implementing such methods will now be presented.

Figure 16A:
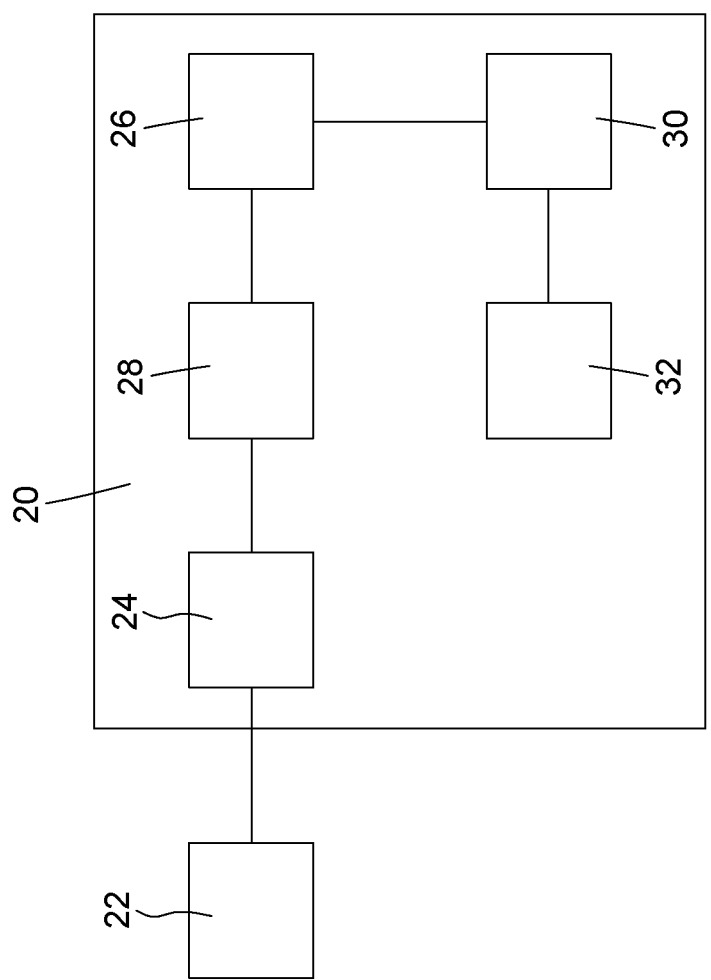
FIGS. 16A-B illustrate a system for measuring, in a gas stream, an analyte concentration level from a gas chromatography elution peak

Referring to FIG. 16A, there is shown an analysis system 20 (sometimes simply referred to as "the system") for analysing a GC elution peak and measuring an analyte concentration level therefrom, according to one embodiment. The analysis system 20 is typically operatively connected to a chromatography column 22 provided upstream of the system 20. The analysis system 20 may be used to receive and detect the components of a gas sample outputted by the chromatography column 22.

The analysis system 20 includes a detector 24 that may be used to analyse the components of the gas stream outputted by the chromatography column 22

In some implementations, the detector 24 is operable in differential mode for acquiring an analyte signal representative of the GC elution peak corrected for baseline artifacts. As it has been previously mentioned, the expression "differential mode" refers to a type of measurement, which may be useful, for example and without being limitative, when the detector 24 is a plasma-based optical emission detector. In such variant, the chemical compounds are ionised and decomposed by collisions with energetic electrons and molecules and atomic components are excited to higher energy levels, emitting radiation in the de-excitation process characteristic of the spectral properties of the species present in the gas sample (resulting in an optical emission spectrum similar to the one illustrated in FIG. 8). Processing this radiation can therefore provide information on the nature and relative concentration of the species in the gas to be analysed.

Figure 16B:
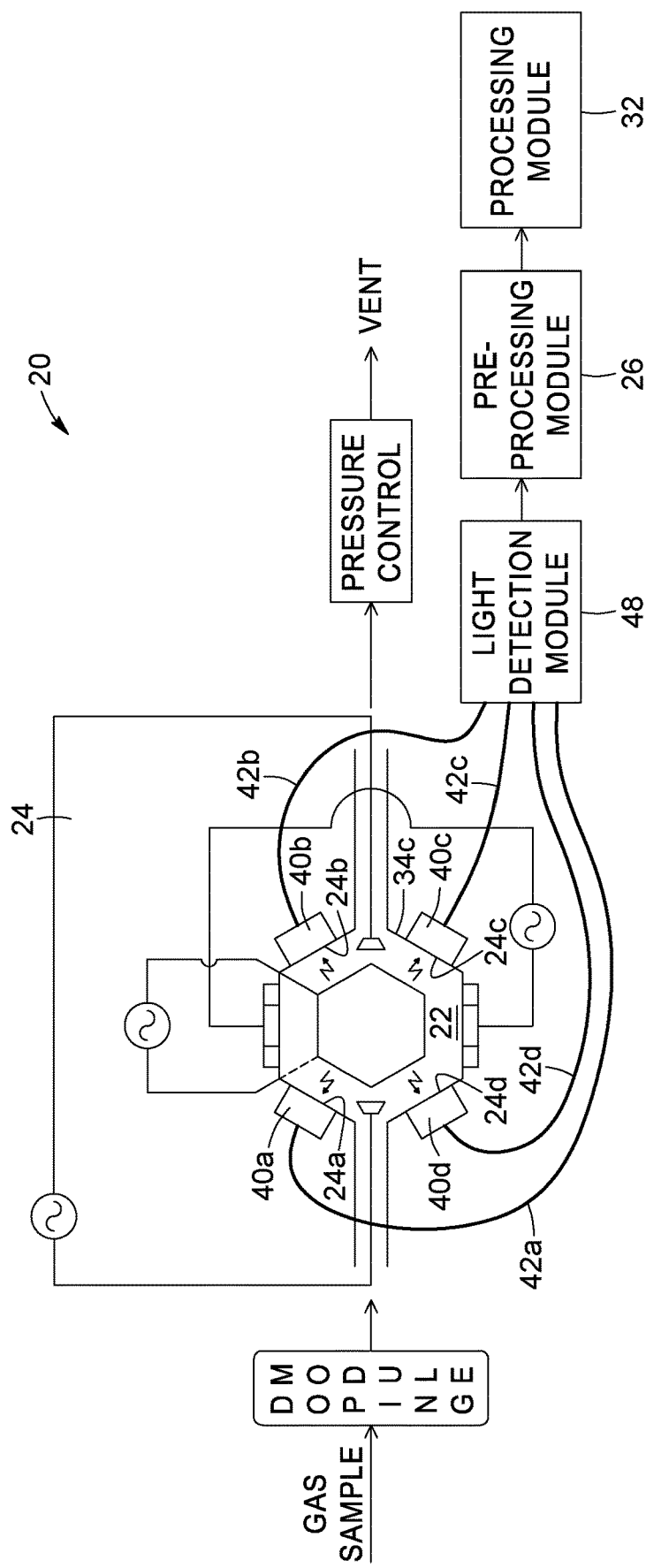

Referring to FIG. 16B, in some embodiments, the plasma-based optical emission detector 24 may include a plasma chamber 22 including windows 24a-d and light collecting assemblies for collecting the light transmitted out of the detector 24. For example, each light collecting assembly could include an optical fiber 42a-d collecting light from a respective window 24a-d provided onto the plasma chamber. The light collecting assemblies may also include lens(es) 40a-d for focusing the radiation into the corresponding optical fiber 42a-d. It will be readily understood that other optical components collecting, guiding, transforming, or otherwise affecting light may additionally or alternatively be provided.

In some embodiments, the light is guided towards a light detection module 48. The light detection module 48 is configured for detecting the radiation collected from the plasma chamber.

In one exemplary implementation, the light detection module 48 may include a plurality of detection cartridges, each associated with the one of the windows of the plasma chamber and the corresponding light collecting assembly. Each detection cartridge may for example include a photodiode receiving light exiting one of the optical fibers and converting the light to an electrical signal. The photodiode could include an operational amplifier having the required electronic gain. An optical filter may be provided in between the output of the optical fiber and the corresponding photodiode, to allow through only a spectral range of interest. Each optical filter may for example be embodied by an interferential filter or the like and is preferably a bandpass filter centered on the wavelength or wavelength range to be monitored by the corresponding detection cartridge. It will be readily understood that in other variants different configurations could be used to extract the spectral information from the detected signals, such as for example using a spectrometer or other spectrally resolved detector to convert the optical energy into analog or digital information. Further details and examples of plasma-based optical emission detectors may be found in patent application WO 2016/141463A1, the entire contents of which is incorporated herein by reference.

In other variants, the detector 24 may alternatively operate according to different detection schemes and may for example be embodied any one of traditional detectors generally used in the gas chromatography field, such as Flame Ionization Detectors (FID), Electron Capture Detectors (ECD), Thermal Conductivity Detectors (TCD), Photoionization Detectors (PID) and Mass spectrometers (MS), or the like.

Referring back to FIG. 16A, the analysis system 20 includes one or more processor, such as the processor 26 (sometimes referred to as the "pre-processing module"). The processor 26 is operatively connected to the detector 24. In general, the processor 26 is operable to perform the pre-processing method and/or the pre-processing steps which have been previously described. In the embodiments in which the detector 24 comprises a light detection module, the processor 26 may be operatively connected to the light detection module.

The system comprises an analog-to-digital converter 28 operatively connected to the detector 24 and to the processor 26 and is configured to digitize the analyte signal generated by the detector 24.

The system includes another processor 30 operatively connected to the processor 26. It is to be noted that the processors 26 and 30 could alternatively be integrated into a single unit, device or processor. The processor 30 is configured for transposing the analyte signal in the frequency domain, pre-processing the analyte signal, and integrating the analyte signal after preprocessing to obtain a redressed analyte signal in the time domain.

The processor 30 can further be configured for performing other time domain pre-processing steps which have been previously mentioned and described.

At the output of the two processors 26, 30, the redressed analyte signal has a substantially Gaussian shape.

The system 20 further comprises another processor 32 (sometimes referred as the "processing module 32") for processing the redressed analyte signal. The processing module 32 is operatively connected to the processors 26 and 30. It is to be noted that, alternatively, the three processors 26, 30 and 32 could be integrated into a single unit, module, device or processor.

The processor 32 may be embodied by or include any processor, computer, or the like apt to process the data obtained from the detector 24. The system 20 may further include a non-transitory computer readable storage medium with a computer program stored thereon, the computer program being operable to perform at least some of the steps of a method described herein, such as the method for measuring, in a gas stream, an analyte concentration level from a gas chromatography elution peak or the method for preprocessing the analyte signal. The computer readable medium may embody at least a part of the processors 26, 30 and 32. It will be readily understood that the reference to a processing module in the singular is not meant to exclude systems including a plurality of components collaborating together to accomplish the desired processing function.

Various embodiments of the processors 26, 30 and 32 are known in the art. Preferably, the processors 26, 30 and 32 are configured to receive a Gaussian signal, as is the case of typical processors known in the art of chromatography. Such conventional processors may then be used to process the analyte signal, once it has been remodeled into a Gaussian redressed analyte signal.

Examples of Implementation

Two examples of implementations will now be described.

First Implementations

While the methods described herein may be useful for different types of detectors technologies such as TCD, FID, ECD and the like, in one example of implementation the methods described herein are applied in conjunction with a plasma base discharge detector such as described in the co-pending patent application WO/2016/141463A1.

As explained in the description of WO/2016/141463A1, selecting a relatively large detector volume to increase the overall emission of any particular impurity flowing therein can be beneficial. This is counter intuitive to the general rules calling for prioritizing the smallest detector internal volume possible in order to avoid peak molecular dilution and diffusion, resulting in peak broadening and loss of sensitivity. At the limit, this interfere with system resolution by allowing more than one peak at the same time into the detector. Generally, a makeup gas is even added to the detector inlet to reduce the residence time of impurities in order to reduce peak broadening. However, doing so also reduces the sensitivity by dilution. Still, the effectiveness of the added make up gas presumes that the molecular distribution coming out of the separation column will be or close to Gaussian distribution, if not the make-up gas is useless.

As explained in the WO/2016/141463A1 application, it may be beneficial in some context to select a relatively large detector volume to increase the overall emission signal associated with one analyte carried by carrier gas. Instead of using a makeup gas to reduce the detrimental effects of the analyte molecules diffusing into the internal volume of the detector, the internal volume of the detector may be virtually controlled by adjusting the internal detector pressure. The specificity of the plasma discharge detector may not only improve the general shape of the signal peak shape, but also reduces baseline noise, drift and may also increase the sensitivity (in some cases up to 30%) of the detector. While a detector with relatively large detector volume (as described in the pending application WO/2016/141463A1) results in many measurable benefits, such as a rise in sensitivity, it may also increase the probability to get a non-Gaussian signal, for example when the analyte level is low, similarly to any other detector types operated in the same conditions. In some scenario, the time distribution of the analyte within the detector could be different than the time distribution of the analyte at one of the outlets of the chromatographic column, due, for example, to analyte reprocessing.

Furthermore, as mentioned above, there are other uncontrolled phenomenon that will lead to completely non-Gaussian peak that will simply be missed by the system. The various mechanical characteristics of the system, i.e., tubing, fitting, surface finish and reactivity, column granulometry, dead volume, line dimension variation, turbulence, flow or pressure upset are changing system equilibrium in time. Also, chemical reactions into the detector itself will affect the molecules density distribution into the expected integration window. In short, the impurity molecules arrival in the detector will be random and variable. However, the inventor's study of various disorder molecular distribution in the time domain in the expected integration window have demonstrated that the total area generated by such analyte molecular flow into the detector is still proportional to the impurity level in the injected sample.

The signal resulting of such transformation is not Gaussian and will not be processed by integration software and recognized as valuable data. We can exemplify this situation with the following example analogy. Let imagine a small container on a weighing scale, used to weigh small beans. If the system has 60 seconds to fill the container with 250 gr. of beans, the bean chute or funnel hopper filling the container could let fall all the beans in one shot, pulses, at a continuous rate, at a rectangular signal shape, or with decreasing or increasing rate. Whatever is the time distribution during the 60 seconds time window, the 250 gr. will be precisely weighted. The weighting scale is acting like an early method of chromatographic peak integration, before the era of semiconductor and software. See for example references [3] and [6].

The random elution of analyte molecules distribution in time are not Gaussian due to molecular dispersion, caused by random adsorption/diffusion and flow path. This leads to unreported analyte level, since the peak shape do not correspond to expected standard. This behavior becomes really apparent and important at low concentration level, i.e. when the number of mole of analytes is very small compared to the carrier or sample gas volume. The statistical distribution of them will not be Gaussian because their number is of the same order of magnitude of various active sites or system intricacy. So, this causes some random delays that are there regardless with larger number of molecules, but their effect is not so apparent because there is a much larger number of analyte molecules that will not be affected and will follow a Gaussian distribution.

Second Implementation

Now referring to FIGS. 7 to 15, another example of implementation of a method for analysing a GC elution peak from an emission-based plasma detector will now be described. More particularly, when the time value exceeds T2 (as defined in FIG. 1), the raw data matrices or table may be processed by the algorithm. In short, the following step are performed:

1) Acquiring the detector signal in differential mode (see FIGS. 8 to 10) by subtracting the baseline next to the emission wavelength (or band of interest), from the signal of the emission wavelength (or band of interest) in real time. Both signals may be offset and scale to have the same parasitic variation in intensity and phase due to baseline signal artifact. The resulting signal may have an observable reduction in noise and drift, which may be caused by baseline upset due to pressure or/flow variation, bad sample background separation, or column temperature ramping;
2) Optionally performing a time-domain ensemble averaging, or other similar techniques to improve the signal-to-noise ratio of the signal, which may result in a signal resembling the one illustrated in FIG. 11;
3) Processing the data by executing a Fourier transform on the baseline subtracted signal, which may result in a signal resembling the one illustrated in FIG. 12;
4) From the Fourier transform result, extracting the DC component, to eliminate the baseline drifting, which may result in a signal resembling the one illustrated in FIG. 13;
5) Noise filtering the transformed data by selecting some of the harmonics and removing them, which may result in a signal resembling the one illustrated in FIG. 14;
6) Processing some of the fundamental harmonics, by passing them through a Gaussian filter, and re-arranging them with the same distribution about the Y axis corresponding to each individual peak height. More particularly, the result of this step is typically a spectral density of the signal to be measured. However, in some scenarios, the spectral density might not follow a Gaussian distribution, and so a Gaussian filter could be used to distribute the spectral energy and enhance some harmonics in order to obtain a more Gaussian signal;
7) Optionally, using other time-domain signals processing techniques, such as flow variation and/or pressure variation to improve peak remodeling;
8) Summing together each result of the Gaussian transfer related to each selected harmonic;
9) Optionally linearizing the signal;
10) Executing a moving average function or other filtering method on the remodeled peak. In this step, the number of points or peak used in this filtering step is dependent on the target sensitivity and desired response time. This step may result in a signal such as the one illustrated in FIG. 15;
11) Tracing the resulting peak on screen; and
12) Driving a digital-to-analog converter with time base equal to same use to do the data acquisition.

Figure 7:
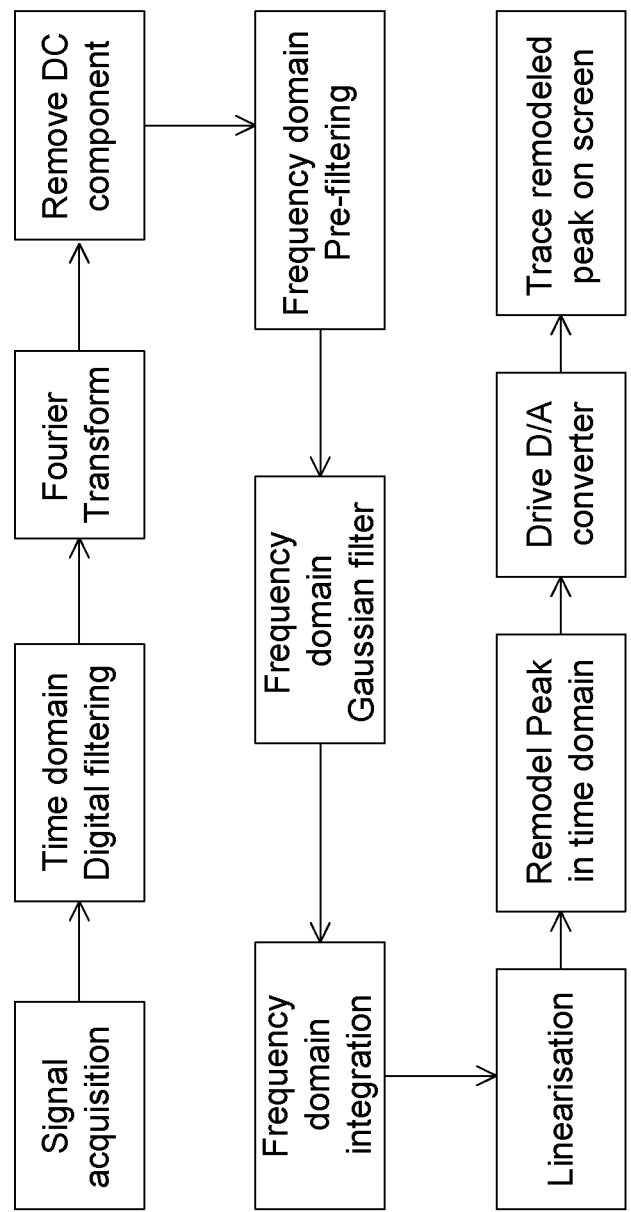
FIG. 7 is a workflow chart of a method for analyzing a gas chromatography elution peak, according to another embodiment.

The above-mentioned method is diagrammatically shown in FIG. 7. This method be used with almost all types of detector. However, and as it has been previously mentioned, the differential measurement is preferably used with the plasma discharge detector or other emission spectroscopy system.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

REFERENCES

[1] Modern practice of gas chromatography, Robert L. Grob and Eugene F. Barry John Wiley & Sons, 2004, p. 43
[2] Advances in Chromatography, J. Calvin Giddings and Roy A. Keller, Marcel Dekker, 1966, p. 205-289
[3] Chromatographic detectors, Raymond P. W. Scott, Chromatographic science series, vol. 73, 1996, p. 457-460
[4] Practical Gas Chromatography, K. Dettmer-Wilde and W. Engewald, Springer, 2014, p. 22-57
[5] Chromatographic Systems and methods for eliminating interference from interfering agents, 2006, U.S. Pat. No. 7,824,471, Gamache et al.
[6] Gas Chromatography, O. K. Doolen, Academic Press—New York and London, 1961, p. 111-117
[7] Advances in Chromatography, J. Calvin Giddings and Roy A. Keller, Marcel Dekker, 1966, p. 224

The invention claimed is:

1. A method for measuring, in a gas stream, an analyte concentration level from a gas chromatography elution peak outputted by a gas chromatography system, the method comprising:
   receiving an analyte signal representative of the gas chromatography elution peak in the time domain;
   converting the analyte signal from the time-domain to the frequency domain;
   in the frequency domain, preprocessing the analyte signal to distinguish frequencies of the analyte signal indicative of the analyte concentration level;
   integrating the analyte signal after preprocessing to obtain a redressed analyte signal in the time domain, the redressed analyte signal having a substantially Gaussian shape; and
   processing the redressed analyte signal to obtain the analyte concentration level.

2. The method of claim 1, further comprising a generating the analyte signal prior to said receiving, comprising:
   circulating the gas stream in plasma chamber of a detector;
   generating a plasma in the gas stream; and
   measuring an optical emission of the plasma, the optical emission being representative of an analyte.

3. The method of claim 2, wherein the optical emission is a spectral line representative of the analyte present in the gas stream.

4. The method of claim 2, wherein measuring the optical emission of the plasma comprises:
   acquiring an emission signal;
   acquiring a reference signal; and
   subtracting the reference signal from the emission signal, thereby obtaining the analyte signal.

5. The method of claim 1, further comprising digitizing the analyte signal before preprocessing the analyte signal.

6. The method of claim 5, wherein the analyte signal has a Nyquist frequency and wherein digitizing the analyte signal is performed at a sampling rate equal or higher than the Nyquist frequency.

7. The method of claim 1, further comprising predetermining an expected elution time window, and wherein receiving the analyte signal representative of the gas chromatography elution peak is performed during the expected elution time window.

8. The method of claim 1, further comprising, prior to the preprocessing, time-domain filtering the analyte signal to remove signal variations therefrom.

9. The method of claim 8, wherein time-domain filtering the analyte signal comprises a continuous wavelet transform applied to the analyte signal.

10. The method of claim 8, wherein time-domain filtering the analyte signal comprises a time-domain signal averaging of the analyte signal.

11. The method of claim 1, wherein converting the analyte signal from the time-domain signal to the frequency domain comprises performing a Fourier transform on the analyte signal.

12. The method of claim 1, wherein preprocessing the analyte signal comprises:
    characterizing a DC component of the analyte signal; and
    filtering the DC component from the analyte signal.

13. The method of claim 1, wherein preprocessing the analyte signal comprises:
    selecting harmonic resonances of the analyte signal; and
    filtering the harmonic resonances from the analyte signal.

14. The method of claim 1, wherein preprocessing the analyte signal comprises:
    obtaining a noise signal representative of a noise level in the gas chromatography system by operating the gas chromatography system without an analyte to be measured therein; and
    subtracting the noise signal from the analyte signal.

15. The method of claim 14, wherein obtaining the noise signal comprises obtaining noise harmonics associated with said noise signal, and wherein subtracting the noise signal comprises filtering said noise harmonics from the analyte signal.

16. The method of claim 1, wherein preprocessing the analyte signal comprises linearizing the analyte signal.

17. The method of claim 2, wherein circulating the gas stream in the plasma chamber of a detector comprises varying at least one of a pressure and a flow of the gas stream in the plasma chamber, to alter a peak shape of the analyte signal.

18. The method of claim 1, wherein integrating the analyte signal comprises summing harmonics of the redressed analyte signal.

19. The method of claim 1, wherein processing the redressed analyte signal comprises performing a moving average on the redressed analyte signal to improve a signal-to-noise ratio of the redressed analyte signal.

20. A computer-implemented method executable by a processor for providing a redressed analyte signal representative of an analyte concentration level from a gas chromatography elution peak outputted by a gas chromatography system, the processor having received an analyte signal representative of the gas chromatography elution peak in the time domain, said method comprising:
    converting the analyte signal from the time-domain to the frequency domain;
    in the frequency domain, preprocessing the analyte signal to distinguish frequencies of the analyte signal indicative of the analyte concentration level; and
    integrating the analyte signal after preprocessing to obtain the redressed analyte signal in the time domain, the redressed analyte signal having a substantially Gaussian shape.

21. A system for measuring, in a gas stream, an analyte concentration level from a gas chromatography elution peak, the system comprising:
    a detector operable for generating an analyte signal representative of the gas chromatography elution peak; and
    one or more processors configured for:
        receiving the analyte signal representative of the gas chromatography elution peak in the time domain;
        converting the analyte signal from the time-domain to the frequency domain;
        in the frequency domain, preprocessing the analyte signal to select frequencies of the analyte signal indicative of the analyte concentration level;
        integrating the analyte signal after preprocessing to obtain the redressed analyte signal in the time domain, the redressed analyte signal having a substantially Gaussian shape; and
        processing the redressed analyte signal to obtain the analyte concentration level.

22. The system of claim 21, wherein the one or more processors are further configured for digitizing the analyte signal before preprocessing the analyte signal.

23. The system of claim 22, wherein the analyte signal has a Nyquist frequency and wherein digitizing the analyte signal is performed at a sampling rate equal or higher than the Nyquist frequency.

24. The system of claim 21, wherein the one or more processors are further configured for predetermining an expected elution time window, and wherein receiving the analyte signal representative of the gas chromatography elution peak is performed during the expected elution time window.

25. The system of claim 21, wherein the one or more processors are further configured for, prior to the preprocessing, time-domain filtering the analyte signal to remove signal variations therefrom.

26. The system of claim 25, wherein time-domain filtering the analyte signal comprises a continuous wavelet transform applied to the analyte signal.

27. The system of claim 25, wherein time-domain filtering the analyte signal comprises a time-domain signal averaging of the analyte signal.

28. The system of claim 21, wherein converting the analyte signal from the time-domain signal to the frequency domain comprises performing a Fourier transform on the analyte signal.

29. The system of claim 21, wherein preprocessing the analyte signal comprises:
    characterizing a DC component of the analyte signal; and
    filtering the DC component from the analyte signal.

30. The system of claim 21, wherein preprocessing the analyte signal comprises:
    selecting harmonic resonances of the analyte signal; and
    filtering the harmonic resonances from the analyte signal.

31. The system of claim 21, wherein preprocessing the analyte signal comprises:

obtaining a noise signal representative of a noise level in the gas chromatography system by operating the gas chromatography system without an analyte to be measured therein; and subtracting the noise signal from the analyte signal.

32. The system of claim 31, wherein obtaining the noise signal comprises obtaining noise harmonics associated with said noise signal, and wherein subtracting the noise signal comprises filtering said noise harmonics from the analyte signal.

33. The system of claim 21, wherein preprocessing the analyte signal comprises linearizing the analyte signal.

34. The system of claim 21, wherein integrating the analyte signal comprises summing harmonics of the redressed analyte signal.

35. The system of claim 21, wherein processing the redressed analyte signal comprises performing a moving average on the redressed analyte signal to improve a signal-to-noise ratio of the redressed analyte signal.

36. The system of claim 21, further comprising an analog-to-digital converter configured to digitize the analyte signal.

37. The system of claim 21, wherein the detector is a plasma discharge detector.

38. The system of claim 21, wherein the detector is configured for:

generating a plasma in the gas stream; and measuring an optical emission of the plasma, the optical emission being representative of the analyte.

39. The system of claim 38, wherein the optical emission is a spectral line representative of the analyte present in the gas stream.

40. The system of claim 38, wherein measuring the optical emission of the plasma comprises:

acquiring an emission signal;

acquiring a reference signal; and subtracting the reference signal from the emission signal, thereby obtaining the analyte signal.

41. A non-transitory computer readable storage medium having stored thereon computer executable instructions for providing a redressed analyte signal representative of an analyte concentration level from a gas chromatography elution peak outputted by a gas chromatography system, the computer executable instructions, when executed by a processor having received an analyte signal representative of the gas chromatography elution peak in the time domain, cause the processor to perform the following steps:

converting the analyte signal from the time-domain to the frequency domain;

in the frequency domain, preprocessing the analyte signal to select frequencies of the analyte signal indicative of the analyte concentration level; and integrating the analyte signal after preprocessing to obtain the redressed analyte signal in the time domain, the redressed analyte signal having a substantially Gaussian shape.

* * * * *